United States Patent
Anagnostopoulos

(10) Patent No.: US 10,421,146 B2
(45) Date of Patent: Sep. 24, 2019

(54) METHODS AND SYSTEMS FOR PRODUCTION OF MESH FROM WIRES OR RODS, WITH CHANGEABLE STEPS FOR LONGITUDINAL AND TRANSVERSE RODS

(71) Applicant: Antonios Anagnostopoulos, Attikis (GR)

(72) Inventor: Antonios Anagnostopoulos, Attikis (GR)

( * ) Notice: Subject to any disclaimer, the term of this patent is extended or adjusted under 35 U.S.C. 154(b) by 101 days.

(21) Appl. No.: 15/586,513

(22) Filed: May 4, 2017

(65) Prior Publication Data

US 2018/0056364 A1 Mar. 1, 2018

Related U.S. Application Data

(60) Provisional application No. 62/381,006, filed on Aug. 29, 2016.

(51) Int. Cl.
*B23K 11/00* (2006.01)
*B23K 11/11* (2006.01)
*B23K 37/04* (2006.01)
*B23K 11/34* (2006.01)
*B23K 35/02* (2006.01)
(Continued)

(52) U.S. Cl.
CPC ............ *B23K 11/008* (2013.01); *B21F 27/20* (2013.01); *B23K 11/11* (2013.01); *B23K 11/34* (2013.01); *B23K 35/0255* (2013.01); *B23K 35/0261* (2013.01); *B23K 37/0408* (2013.01); *B23K 37/0435* (2013.01); *B23K 37/0461* (2013.01);
(Continued)

(58) Field of Classification Search
None
See application file for complete search history.

(56) References Cited

U.S. PATENT DOCUMENTS 3,405,743 A * 10/1968 Robinson ................ B21F 27/10
140/112
3,578,934 A * 5/1971 Beauvais ............. B23K 11/008
219/56
(Continued)

*Primary Examiner* — John Fox
(74) *Attorney, Agent, or Firm* — Andrew F. Young, Esq.; Lackenbach Siegel, LLP

(57) ABSTRACT

Systems and methods for producing mesh from wires or rods with programmed changeable steps for the longitudinal and transverse wires. The longitudinal wires (1) and the transverse wires (12) may be fed from coils or be precut. The longitudinal wires are fed in receptacles (2) on carriers (3) with the carriers being found on prefeeder carrier (4), a feeder carrier (6) with grippers (7) transports them towards the welding heads (10) and the produced mesh (20) is received by a mesh carrier (14). The carriers (3) with the receptacles (2) for the longitudinal wires on the prefeeder carrier (4), the grippers for the longitudinal wires (7) at the feeder carrier (6) and the welding heads (10) are displaced in the direction of the transverse wire without restrictions, generally in an unrestricted fashion, so as to correspond to the longitudinal wires being subjected to welding. The transverse wires are fed towards the welding heads to be welded with the longitudinal wires. The machine produces meshes with openings, grouping the longitudinal wires in groups and feeding the groups of longitudinal wires towards the welding heads, adjusting the position of the related mechanisms to the position of the longitudinal wires.

6 Claims, 21 Drawing Sheets

(51) Int. Cl.
*B21F 27/20* (2006.01)
*B23K 101/22* (2006.01)
*B23K 101/32* (2006.01)

(52) U.S. Cl.
CPC ...... *B23K 2101/22* (2018.08); *B23K 2101/32* (2018.08)

(56) References Cited

U.S. PATENT DOCUMENTS

| | | | | |
|---|---|---|---|---|
| 4,291,732 | A * | 9/1981 | Artzer | B21F 27/20 140/105 |
| 5,020,575 | A * | 6/1991 | Grabuschnig | B21F 23/005 140/112 |
| 2012/0103460 | A1 * | 5/2012 | Anagnostopoulos | B21F 23/005 140/112 |
| 2014/0101941 | A1 * | 4/2014 | Nussbaumer | B21F 27/20 29/897.31 |

* cited by examiner

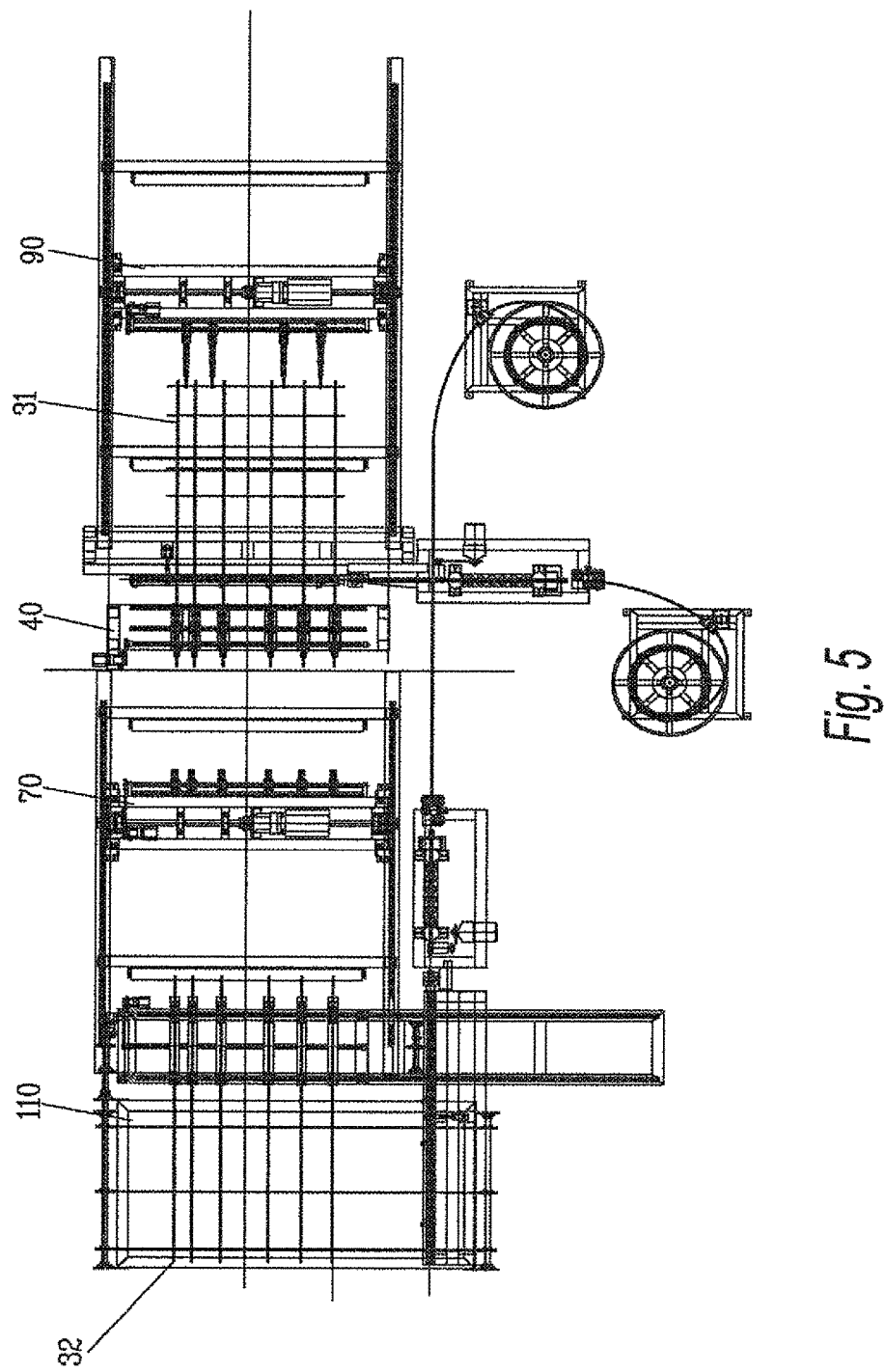

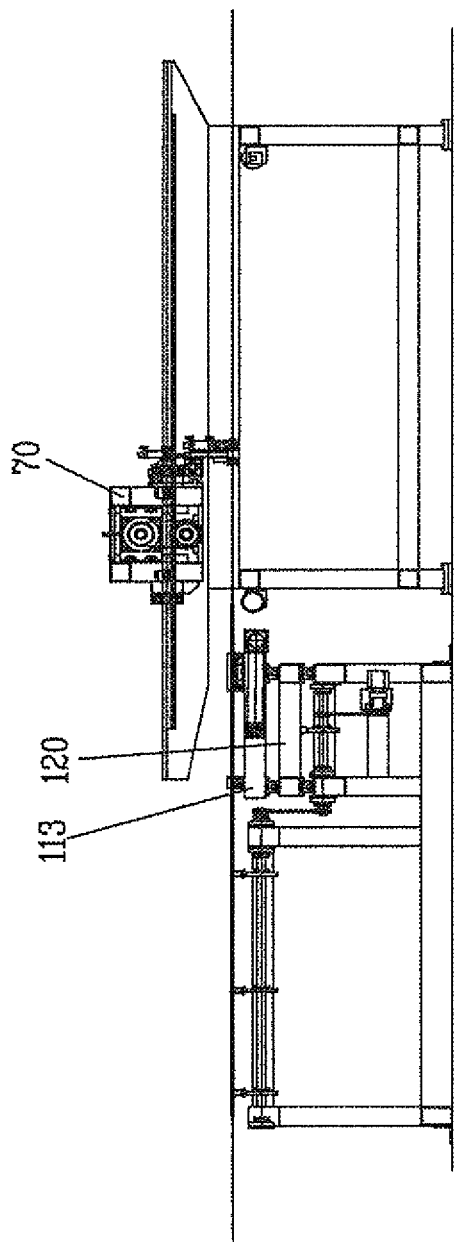

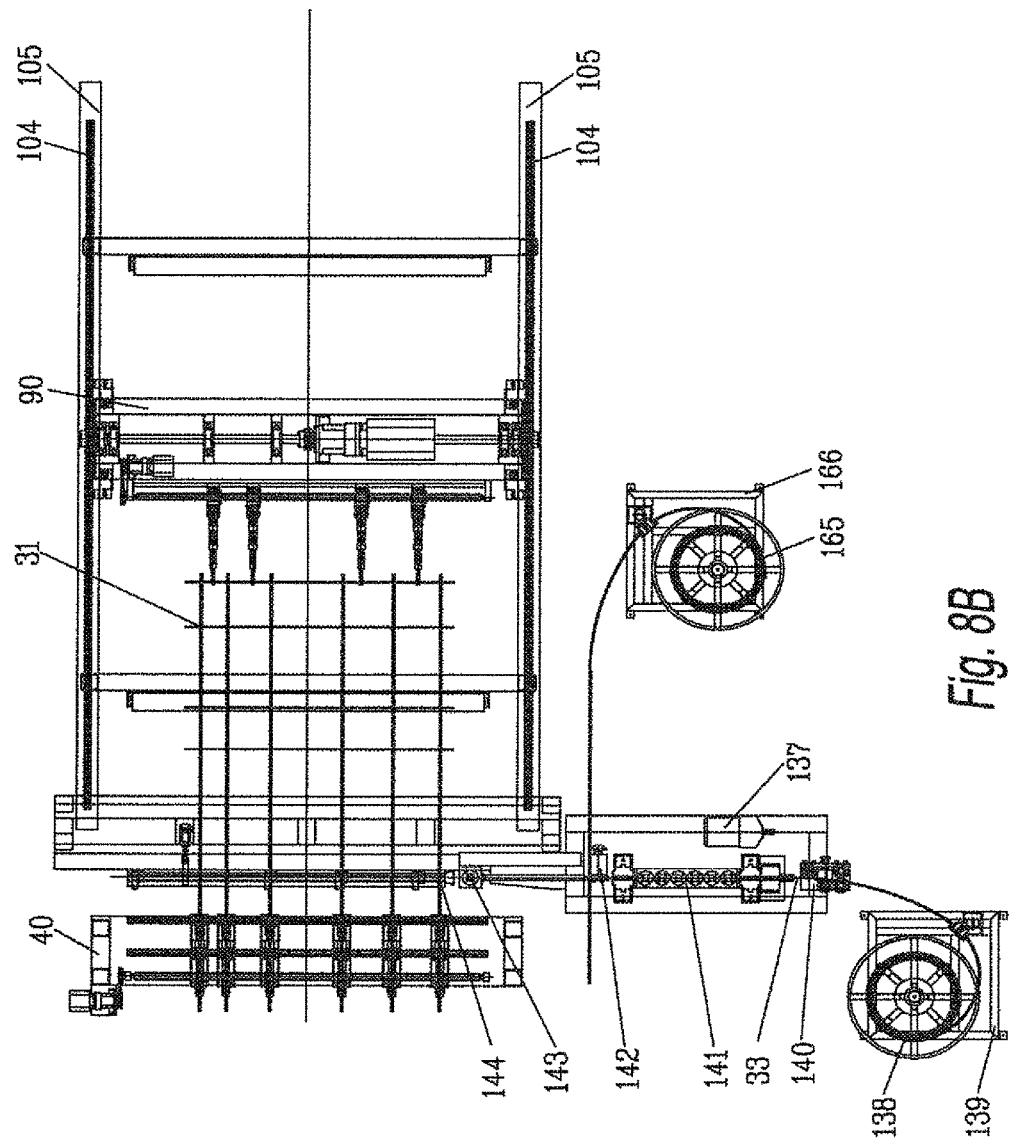

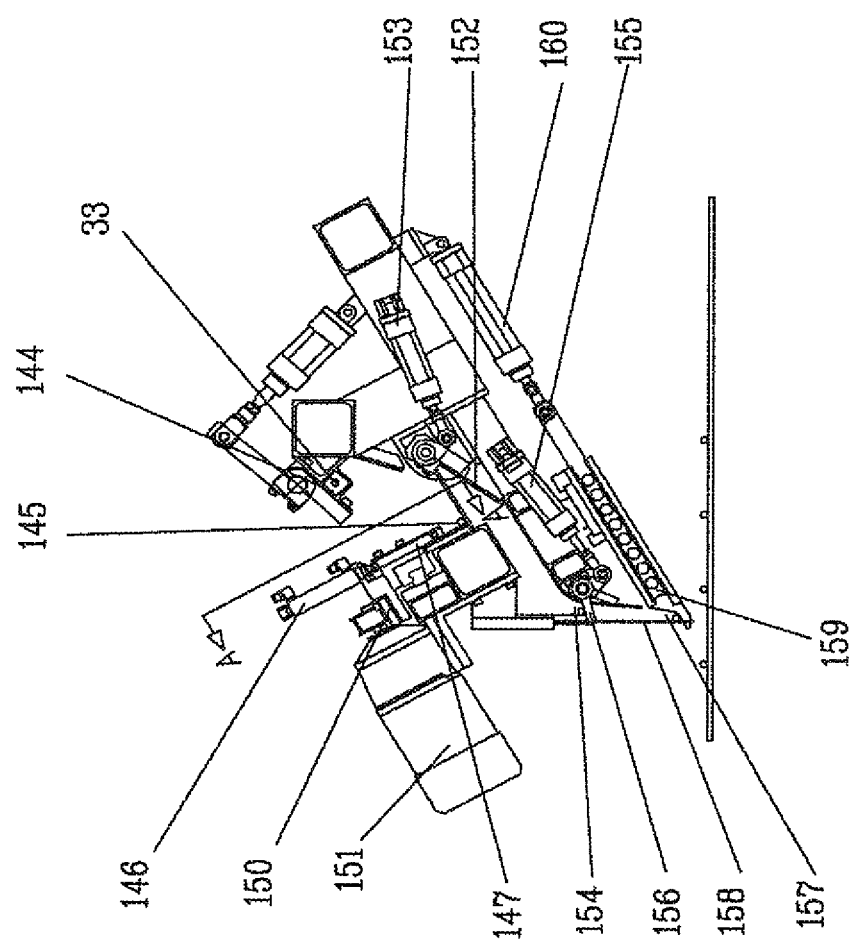

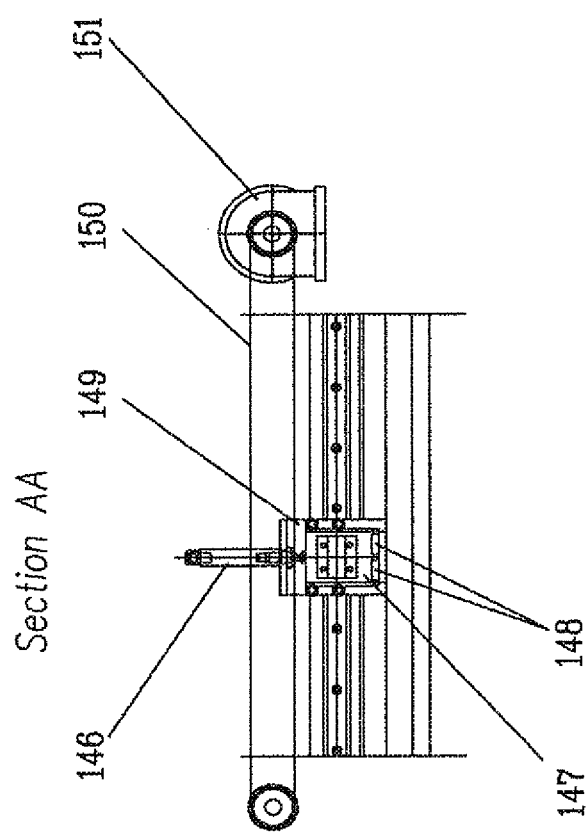

METHODS AND SYSTEMS FOR PRODUCTION OF MESH FROM WIRES OR RODS, WITH CHANGEABLE STEPS FOR LONGITUDINAL AND TRANSVERSE RODS

CROSS REFERENCE TO RELATED APPLICATIONS

This application relates to and claims priority from U.S. Prov. Ser. No. 62/381,006 filed Aug. 29, 2016, the entire contents of which are incorporated herein by reference.

TECHNICAL FIELD

The present disclosure relates to a method and system for production of meshes from wires or rods, with programmed changeable steps for the longitudinal and transverse wires. The longitudinal wires and the transverse wires may be supplied from spools or may be precut. The longitudinal wires are supplied to receptacles on carriers, with these carriers, in turn being located upon a prefeeder carrier. A feeder carrier with grippers transports them (the rods/wires, that is) towards the welding heads, and the produced mesh is received by a mesh carrier. The carriers with the receptacles for the longitudinal wires upon the prefeeder carrier, the grippers for the longitudinal wires at the feeder carrier and the welding heads are all individually selectively relocatable/repositionable, subject to control (controllably), in an unrestricted manner, in the transverse direction without restrictions so as to correspond to the subject to welding longitudinal wires. The transverse wires are fed towards the welding heads where they are welded with the longitudinal wires. The machine has the capability to produce meshes with openings and meshes with different lengths of longitudinal wires, by grouping the longitudinal wires into groups and supplying these groups of longitudinal wires towards the welding heads. The respective positions of the relevant associated mechanisms (of the respective mechanisms) are adjusted to correspond to the positions of the longitudinal wires.

BACKGROUND

The existing welding machines present great flexibility as to welding of the longitudinal wires. The steps between the longitudinal wires may be shiftable, among them (mutually among all of them, and/or between, or among, any of them), along the length of production of the mesh.

Welding machines that produce standardized mesh have advancement mechanisms and welding heads or welding locations with electrode pairs, at fixed distances. Their flexibility, however, ends simply at (extends only as far as) the production of meshes with steps of longitudinal wires at multiples of a basic distance. Changes to the spacings of the longitudinal wires requires many mechanical tasks and is time consuming.

In another category of welding machines the supplying of longitudinal wires is made manually from precut wires. Changes in the spacings between the longitudinal wires is made by manually moving the welding heads, the guides and the related mechanisms. This machine presents some flexibility but low productivity because of the manual feeding of the longitudinal wires.

Another category of welding machines is that wherein the supply of the longitudinal wires is made from precut wires and the movement of the welding heads, the guides, and the related mechanisms is made via automation and may produce meshes with changeable steps of the longitudinal wires without limitation as to the step. In such machines the longitudinal wires are automatically supplied from a longitudinal wires deposition table/storage at a feeder carrier having magnetic mechanisms or mechanisms with grippers. The disadvantages of these machines are that the feeding mechanisms for the longitudinal wires, in order that the automated grippers function, require a large number of longitudinal wires at the location of initial automated receiving and that the longitudinal wires in this case may be of only one diameter. A further disadvantage is that towards the end of production of a series of produced meshes the precut wires must be placed on the feeder manually. Furthermore, they cannot produce meshes having different lengths of longitudinal wires nor meshes having openings. These machines are not capable of producing small quantities of meshes (1-20 pieces) because of the peculiarities (peculiarities, particularities, individuality) of the feeding mechanisms that require a large number of longitudinal wires.

ASPECTS AND SUMMARY OF THE INVENTION

The object of the present disclosure is to present a method, which method automatically produces meshes with openings, with changeable steps of the longitudinal wires, and in small quantities, without restrictions. The scope of the present disclosure is to present a system, which system automatically produces meshes with openings and with changeable steps of the longitudinal wires, possibly with different diameters and different lengths without restrictions, with great flexibility in the production of various meshes.

The present disclosure may also be understood as being directed to a prefeeder for a mesh production system, comprising:
- a prefeeder carrier;
- said prefeeder carrier having a plurality of receptacle carriers movably mounted thereon;
- a first arrangement of bearings between said prefeeder carrier and said plurality of receptacle carriers;
- each of said plurality of receptacle carriers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective receptacle carriers on said first arrangement of bearings along said prefeeder carrier and along the length of said linear screw;
- a first motor operatively connected to controllably rotate said linear screw;
- each of said plurality of receptacle carriers including at least one receptacle configured to receive a mesh wire;
- said prefeeder carrier being movably mounted on a base;
- a second arrangement of bearings between said prefeeder carrier and said base; and,
- a second motor operatively connected to controllably translate and position said prefeeder carrier on said base.

The present disclosure may also be understood as being directed to this prefeeder for a mesh production system as above discussed, further comprising:

a first chain operatively connected to said prefeeder carrier, said first chain being controllably driven by said second motor.

The present disclosure may also be understood as being directed to a feeder carrier system comprising:

a plurality of feeder grippers, said plurality of feeder grippers being movably mounted on a support base;

an arrangement of bearings between said plurality of feeder grippers and said support base;

each of said plurality of feeder grippers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective receptacle carriers on said arrangement of bearings along said plate and along the length of said linear screw;

a first motor operatively connected to controllably rotate said linear screw;

each of said plurality of feeder grippers including a respective controllable actuator connected to controllably activate the respective feeder gripper to grip mesh wire;

each of said plurality of feeder grippers including a respective controllable elevation actuator connected to selectively and controllably move its respective feeder gripper out of a plane of mesh production;

said support base being supported on a feeder carrier frame;

an arrangement of guides supporting said feeder carrier frame; and, a second motor operatively connected to drive and position said feeder carrier frame along said arrangement of guides.

The present disclosure may also be understood as being directed to a welding machine comprising:

a plurality of welding heads, said plurality of welding heads being movably mounted on a welder base;

an arrangement of bearings between said plurality of welding heads and said welder base;

each of said plurality of welding heads including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective welding heads on said arrangement of bearings along said welder base and along the length of said linear screw;

a first motor operatively connected to controllably rotate said linear screw;

each of said plurality of welding heads including a respective controllable actuator connected to controllably activate a respective gripper to grip mesh wire;

each of said plurality of welding heads including a pair of electrodes situated to weld transverse wires to longitudinal wires for mesh production.

The present disclosure may also be understood as being directed to a mesh carrier system comprising:

a plurality of mesh grippers, said plurality of mesh grippers being movably mounted on a support base;

an arrangement of bearings between said plurality of mesh grippers and said support base;

each of said plurality of mesh grippers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective mesh grippers on said arrangement of bearings along said support base and along the length of said linear screw;

a first motor operatively connected to controllably rotate said linear screw;

each of said plurality of mesh grippers including a respective controllable actuator connected to controllably activate the respective mesh gripper to grip mesh wire by closing δαγκάνεζ;

each of said plurality of mesh grippers including a respective controllable elevation actuator connected to selectively and controllably tilt its respective feeder gripper out of a plane of mesh production;

said support base being supported on a mesh carrier frame;

an arrangement of guides supporting said mesh carrier frame; and, a second motor operatively connected to drive and position said mesh carrier frame along said arrangement of guides.

The present disclosure may also be understood as being directed to an entire mesh production system comprising:

a prefeeder including a prefeeder carrier;

said prefeeder carrier having a plurality of receptacle carriers movably mounted thereon;

a first arrangement of bearings between said prefeeder carrier and said plurality of receptacle carriers;

each of said plurality of receptacle carriers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches. and driven in translation on said linear screw by a rotation of said linear screw when engaged by their respective clutches thus controllably translating and positioning their respective receptacle carriers on said first arrangement of bearings along said prefeeder carrier and along the length of said linear screw;

a respective motor operatively connected to controllably rotate said linear screw;

each of said plurality of receptacle carriers including at least one receptacle configured to receive a mesh wire;

said prefeeder carrier being movably mounted on a base;

a second arrangement of bearings between said prefeeder carrier and said base; and, a respective motor operatively connected to controllably translate and position said prefeeder carrier on said base;

this mesh production system further comprising
a feeder carrier assembly comprising,
a plurality of feeder grippers, said plurality of feeder grippers being movably mounted on a support base;
an arrangement of bearings between said plurality of feeder grippers and said support base;
each of said plurality of feeder grippers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective receptacle carriers on said arrangement of bearings along said plate and along the length of said linear screw;
a respective motor operatively connected to controllably rotate said linear screw;
each of said plurality of feeder grippers including a respective controllable actuator connected to controllably activate the respective feeder gripper to grip mesh wire;
each of said plurality of feeder grippers including a respective controllable elevation actuator connected to selectively and controllably move its respective feeder gripper out of a plane of mesh production;
said support base being supported on a feeder carrier frame;
an arrangement of guides supporting said feeder carrier frame; and,
a respective motor operatively connected to drive and position said feeder carrier frame along said arrangement of guides;

this mesh production system further comprising
a welding unit comprising,
a plurality of welding heads, said plurality of welding heads being movably mounted on a welder base;
an arrangement of bearings between said plurality of welding heads and said welder base;
each of said plurality of welding heads including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective welding heads on said arrangement of bearings along said welder base and along the length of said linear screw;
a respective motor operatively connected to controllably rotate said linear screw;
each of said plurality of welding heads including a respective controllable actuator connected to controllably activate a respective gripper to grip mesh wire;
each of said plurality of welding heads including electrodes situated to weld transverse wires to longitudinal wires for mesh production;
a transverse wire deposition assembly;

this mesh production system further comprising
a mesh carrier assembly comprising,
a plurality of mesh grippers, said plurality of mesh grippers being movably mounted on a support base;
an arrangement of bearings between said plurality of mesh grippers and said support base;
each of said plurality of mesh grippers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective mesh grippers on said arrangement of bearings along said support base and along the length of said linear screw;
a respective motor operatively connected to controllably rotate said linear screw;
each of said plurality of mesh grippers including a respective controllable actuator connected to controllably activate the respective mesh gripper to grip mesh wire by closing;
each of said plurality of mesh grippers including a respective controllable elevation actuator connected to selectively and controllably tilt its respective feeder gripper out of a plane of mesh production;
said support base being supported on a mesh carrier frame;
an arrangement of guides supporting said mesh carrier frame; and,
a second motor operatively connected to drive and position said mesh carrier frame along said arrangement of guides.

The present disclosure may also be understood as being directed to an entire mesh production system comprising:
a prefeeder, said prefeeder including a prefeeder carrier;
said prefeeder carrier having a plurality of receptacle carriers movably mounted thereon;
a first arrangement of bearings between said prefeeder carrier and said plurality of receptacle carriers;
each of said plurality of receptacle carriers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective receptacle carriers on said first arrangement of bearings along said prefeeder carrier and along the length of said linear screw;
a respective motor operatively connected to controllably rotate said linear screw;
each of said plurality of receptacle carriers including at least one receptacle configured to receive a mesh wire;
said prefeeder carrier being movably mounted on a base;
a second arrangement of bearings between said prefeeder carrier and said base; and, a respective motor operatively connected to controllably translate and position said prefeeder carrier on said base;

this mesh production system further comprising
a feeder carrier assembly including a plurality of feeder grippers, said plurality of feeder grippers being movably mounted on a support base and controllably positionable on said support base to each respectively selectively receive wire from a respective receptacle carrier of said prefeeder carrier;
each of said plurality of feeder grippers including a respective controllable elevation actuator connected to selectively and controllably move its respective feeder gripper out of a plane of mesh production;
said support base being supported on a feeder carrier frame;
an arrangement of guides supporting said feeder carrier frame; and,
a respective motor operatively connected to drive and position said feeder carrier frame along said arrangement of guides;

this mesh production system further comprising
a welding unit including a plurality of welding heads, said plurality of welding heads being movably mounted on a welder base and for controlled positioning on said welder base to each respectively selectively receive wire from an aligned respective feeder gripper of said feeder carrier;
each of said plurality of welding heads including of electrodes situated to weld transverse wires to longitudinal wires for mesh production;
a transverse wire deposition assembly;
a mesh carrier assembly including a plurality of mesh grippers, said plurality of mesh grippers being movably mounted on a support base, and controllably positionable on said support base to each respectively grip mesh wire;
said support base being supported on a mesh carrier frame;
an arrangement of guides supporting said mesh carrier frame; and,
a respective motor operatively connected to drive and position said mesh carrier frame along said arrangement of guides.

The present disclosure may also be understood as being directed to an entire mesh production system comprising:
a prefeeder, said prefeeder including a prefeeder carrier;
said prefeeder carrier having a plurality of receptacle carriers movably mounted thereon;
a first arrangement of bearings between said prefeeder carrier and said plurality of receptacle carriers;
each of said plurality of receptacle carriers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective receptacle carriers on said first arrangement of bearings along said prefeeder carrier and along the length of said linear screw;
a respective motor operatively connected to controllably rotate said linear screw;

each of said plurality of receptacle carriers including at least one receptacle configured to receive a mesh wire;
said prefeeder carrier being movably mounted on a base;
a second arrangement of bearings between said prefeeder carrier and said base; and,
a respective motor operatively connected to controllably translate and position said prefeeder carrier on said base;
a feeder carrier assembly including a plurality of feeder grippers, said plurality of feeder grippers being movably mounted on a support base and controllably positionable on said support base to each respectively selectively receive wire from an aligning/aligned respective receptacle carrier of said prefeeder carrier;
said plurality of feeder grippers being selectively and controllably moveable out of a plane of mesh production;
a respective motor operatively connected to drive and position said feeder carrier assembly towards a welding unit;
said welding unit including a plurality of welding heads, said plurality of welding heads being movably mounted on a welder base and for controlled positioning on said welder base to each respectively selectively receive wire from an aligned respective feeder gripper of said feeder carrier;
each of said plurality of welding heads including electrodes situated to weld transverse wires to longitudinal wires for mesh production;
a transverse wire deposition assembly;
a mesh carrier assembly including a plurality of mesh grippers, said plurality of mesh grippers being movably mounted for controlled positioning to respective positions where each of said mesh grippers respectively grips mesh transverse wire; and,
a respective motor operatively connected to drive and position said mesh carrier assembly away from said welding unit.

The present disclosure may also be understood as being directed to an entire mesh production system comprising:
a prefeeder, said prefeeder including a prefeeder carrier;
said prefeeder carrier having a plurality of receptacle carriers movably mounted thereon;
a first arrangement of bearings between said prefeeder carrier and said plurality of receptacle carriers;
each of said plurality of receptacle carriers including a respective associated controllable clutch, each of said respective controllable clutches being situated to controllably engage a respective rotary nut, said rotary nuts all being mounted on a linear drive so that they are driven in rotation by a rotation of said linear drive when not engaged by their respective clutches, and driven in translation on/along said linear drive by a rotation of said linear drive when engaged by their respective clutches thus controllably translating and positioning their respective receptacle carriers on said first arrangement of bearings along said prefeeder carrier and along the length of said linear drive;
a respective motor operatively connected to controllably rotate said linear drive;
each of said plurality of receptacle carriers including at least one receptacle configured to receive a mesh wire;
said prefeeder carrier being movably mounted on a base;
a second arrangement of bearings between said prefeeder carrier and said base; and, a respective motor operatively connected to controllably translate and position said prefeeder carrier on said base;

a feeder carrier assembly including a plurality of feeder grippers, said plurality of feeder grippers being movably mounted on a support base and being controllably positionable on said support base to each respectively selectively receive wire from a respective receptacle carrier of said prefeeder carrier;

said plurality of feeder grippers being selectively and controllably moveable out of a plane of mesh production;

a respective motor operatively connected to drive and position said feeder carrier assembly towards a welding unit;

said welding unit including a plurality of welding heads, said plurality of welding heads being movably mounted on a welder base and for controlled positioning on said welder base to each respectively selectively receive wire from an aligned/aligning respective feeder gripper of said feeder carrier;

each of said plurality of welding heads including electrodes situated to weld transverse wires to longitudinal wires for mesh production;

a transverse wire deposition assembly;

a mesh carrier assembly including a plurality of mesh grippers, said plurality of mesh grippers being movably mounted for controlled positioning to respective positions where each of said mesh grippers respectively grips mesh transverse wire; and, a respective motor operatively connected to drive and position said mesh carrier assembly away from said welding unit.

The present disclosure may also be understood as being directed to an entire mesh production system comprising:

a prefeeder, said prefeeder including a prefeeder carrier;

said prefeeder carrier having a plurality of receptacle carriers movably mounted thereon;

each of said plurality of receptacle carriers individually being controllably positionable along said prefeeder carrier;

a respective motor operatively connected to selectively controllably position said plurality of receptacle carriers, in an unrestricted manner;

each of said plurality of receptacle carriers including at least one receptacle configured to receive a mesh wire;

said prefeeder carrier being movably mounted on a base;

a respective motor operatively connected to controllably translate and position said prefeeder carrier on said base;

a feeder carrier assembly including a plurality of feeder grippers, said plurality of feeder grippers being movably mounted on a support base and controllably positionable on said support base to each respectively selectively receive wire from an aligning/aligned respective receptacle carrier of said prefeeder;

said plurality of feeder grippers being selectively/controllably moveable out of a plane of mesh production;

a respective motor operatively connected to drive and position said feeder carrier assembly towards a welding unit;

said welding unit including a plurality of welding heads, said plurality of welding heads being movably mounted on a welder base and for controlled positioning on said welder base to each respectively selectively receive wire from an aligned respective feeder gripper of said feeder carrier;

each of said plurality of welding heads including electrodes situated to weld transverse wires to longitudinal wires for mesh production;

a transverse wire deposition assembly;

a mesh carrier assembly including a plurality of mesh grippers, said plurality of mesh grippers being movably mounted for controlled positioning to respective positions where each of said mesh grippers respectively grips mesh transverse wire; and, a respective motor operatively connected to drive and position said mesh carrier assembly away from said welding unit.

The present disclosure may also be understood as being directed to a method for mesh production including steps of:

adjusting the positions of receptacle carriers movably mounted on a prefeeder carrier, by a linear drive, to (correspond to) selected spacings of a group of longitudinal wires of a mesh;

advancing the prefeeder carrier with the adjusted positions of receptacle carriers past an axis location-of/located-at longitudinal wire supply, to fill selected receptacle carriers to form a first group of longitudinal wires of a mesh;

repositioning the filled receptacle carriers to a feeder carrier hand-off location by translating the prefeeder carrier;

adjusting the positions of feeder grippers movably mounted on the feeder carrier to correspond to the selected spacings of the group of longitudinal wires of the mesh;

selectively/controllably moving a feeder gripper out of a plane of mesh production;

moving the feeder carrier towards the hand-off location to align the positions of its adjusted feeder grippers with the filled receptacle carriers of the prefeeder carrier at the hand-off location;

gripping the group of longitudinal wires with the adjusted feeder grippers and advancing them towards a welding unit;

adjusting the positions of welding heads movably mounted along a welding line to correspond to the selected spacings of the group of longitudinal wires of the mesh;

receiving the group of longitudinal wires of the mesh in the adjusted welding heads;

welding a transverse wire on the group of longitudinal wire via the adjusted welding heads, to produce mesh;

adjusting the positions of mesh grippers movably mounted on a mesh carrier so that they engage a mesh transverse wire without interference from mesh longitudinal wires; and engaging a mesh transverse wire with the mesh grippers to extract/move mesh out of the welding unit;

moving the mesh carrier either to or away from the welding line, as an option.

As above, additional steps may include readjustments of the positions of the receptacle carriers and of the positions of the feeder grippers, while mesh is being produced, for example to receive/correspond to selected spacings of another group of longitudinal wires of the mesh. As well, the delivery of this second group to the welding line while the first group of wires is still at least partly located within it. The steps may be performed with the structures, devices, systems, and options as described herein, as for example the adjusting/adjustment steps.

The appended reference symbol list is a component of the disclosure. The figures are described in a cohesive and comprehensive manner. Any reference symbols which may be the same in different Figures denote the same parts; any reference symbols with different indices should be generally understood to specify components with the same or similar functions. In the figures;

BRIEF DESCRIPTION OF THE DRAWINGS

FIGS. 4A to 4L depict the principle of operation of the method on the example mesh of drawing 3B, and more specifically:

FIG. 4A depicts changing of positions of the receptacles carriers of the prefeeder carrier, the grippers of the feeder carrier and the welding heads.

FIG. 4B depicts the feeding of the first group of longitudinal wires to the prefeeder carrier.

FIG. 4C depicts the transport of the first group of longitudinal wires with the feeder carrier towards the welding heads.

FIG. 4D depicts the delivery of longitudinal wires to the welding heads.

FIG. 4E depicts the welding of the longitudinal wires of the first group of longitudinal wires with the transverse wires and the simultaneous movement of the grippers of the feeder carrier and the receptacles carriers of the prefeeder carrier so that they may receive the second group of longitudinal wires.

FIG. 4F depicts the movement of the prefeeder carrier, the movement of the grippers of the feeder carrier and the welding heads so as to correspond to the second group of longitudinal wires.

FIG. 4G depicts the transport of the second group of longitudinal wires to the welding heads.

FIG. 4H depicts the delivery of the second group of longitudinal wires with transverse wires to the welding heads.

FIG. 4K depicts the welding of the second group of longitudinal wires with the transverse wires at the welding heads.

FIG. 4L depicts the delivery of the mesh with opening.

FIG. 5 depicts the machine in top view.

FIG. 7A depicts the first half of the machine in side view.

FIG. 8B depicts in magnified view the second half of the machine in top view.

FIG. 13A depicts a feeding of a transverse wire towards the welder.

FIG. 13B depicts the mechanism for the displacement for transfer of the transverse wire transverse to the direction of the longitudinal wires.

DETAILED DESCRIPTION OF THE PREFERRED EMBODIMENTS

Figure 1:
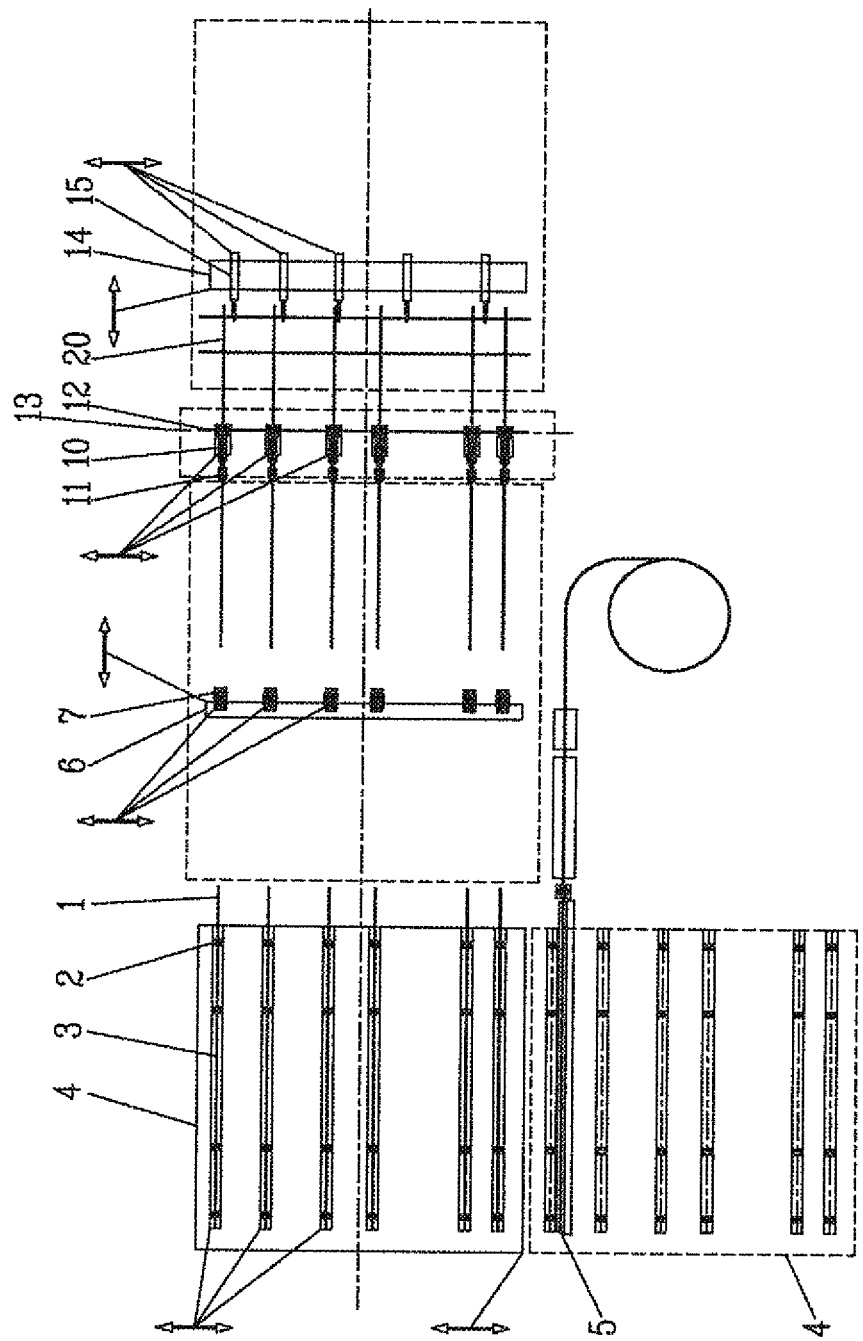
FIG. 1 depicts the initiation of the method in a top view.
Figure 2A:
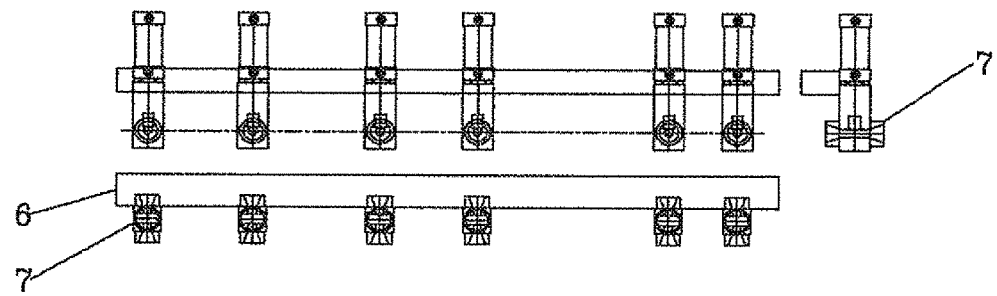
FIG. 2A depicts the feeder carrier with all the grippers in positions for transporting longitudinal wires.
Figure 2B:
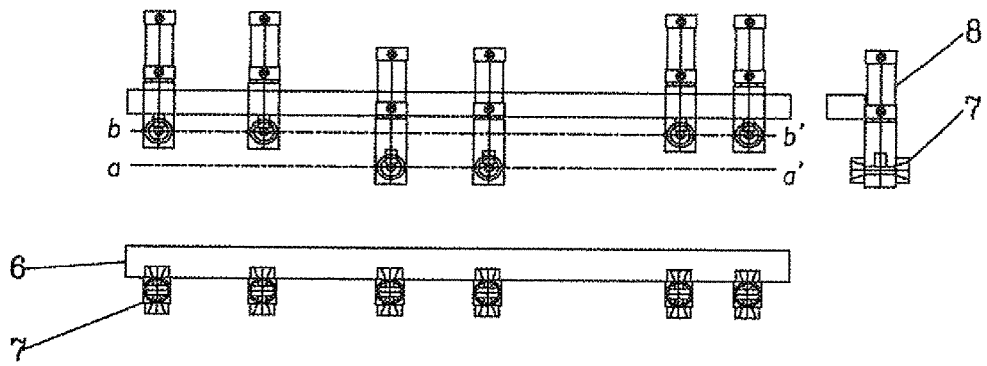
FIG. 2B depicts the feeder carrier with its two interior grippers in positions for transporting longitudinal wires.
Figure 3A:
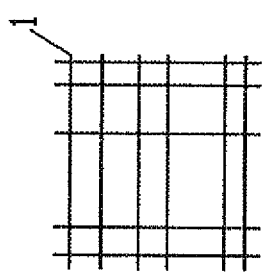
FIG. 3A depicts an example of a mesh with changeable steps, generally and possibly both in longitudinal and transverse directions.
Figure 3B:
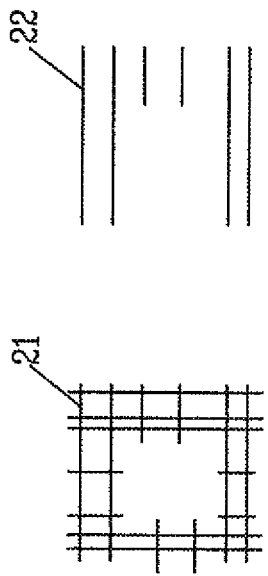
FIG. 3B depicts an example of a mesh with changeable steps and possible openings in the mesh.
Figure 3C:
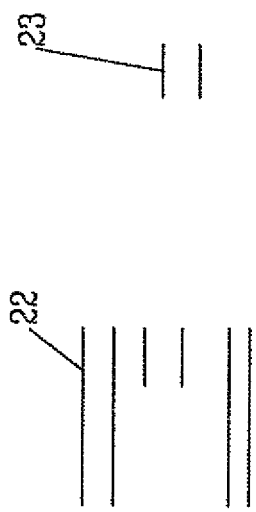
FIG. 3C depicts a group of longitudinal wires of the mesh of 3B.
Figure 3D:
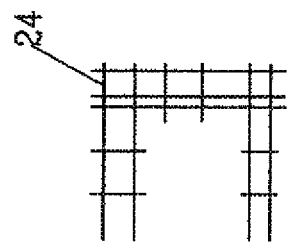
FIG. 3D depicts a second group of longitudinal wires of the mesh of 3B.
Figure 3E:
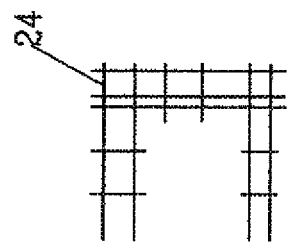
FIG. 3E depicts the produced mesh up until the feeding of the second group of longitudinal wires.
Figure 4A:
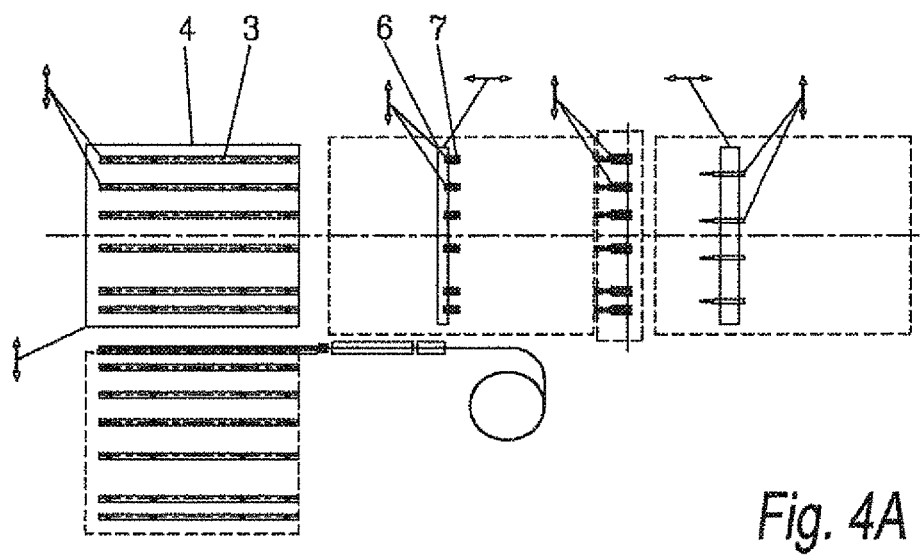
Figure 4B:
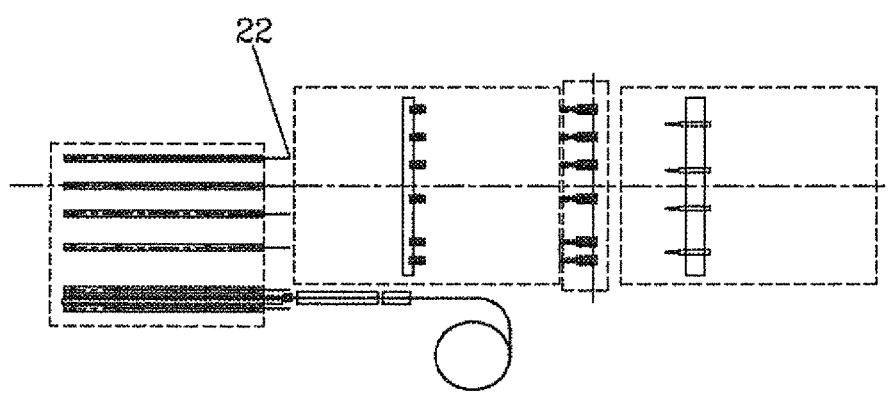
Figure 4C:
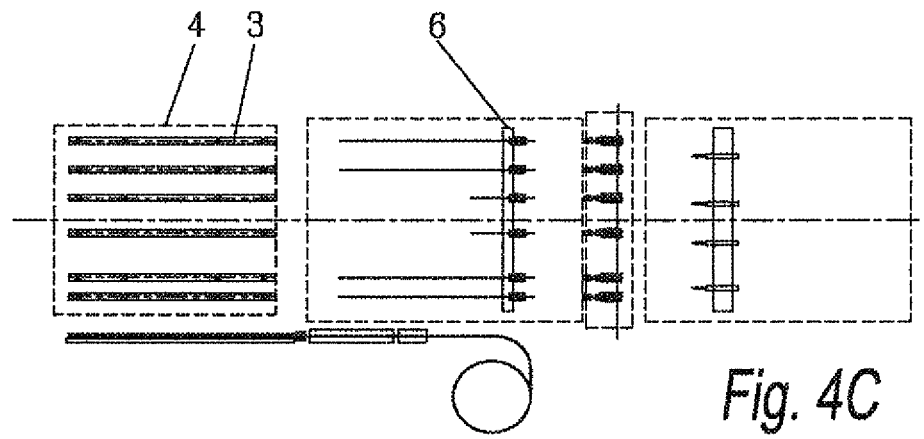
Figure 4D:
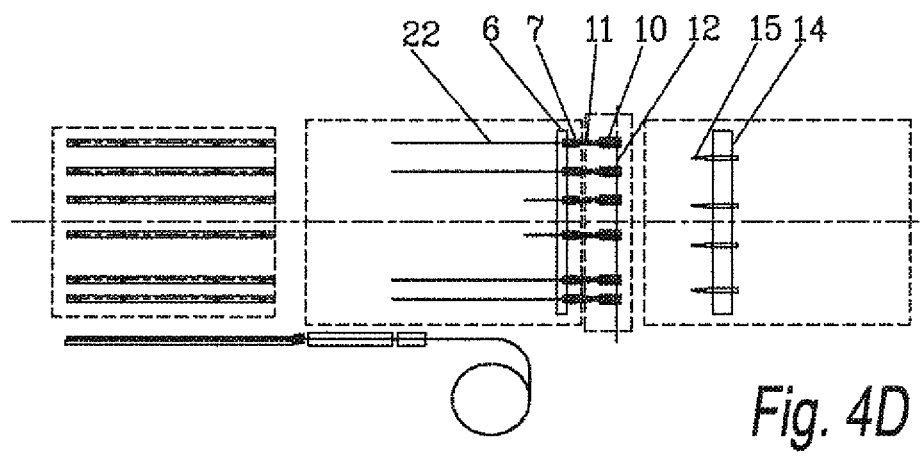
Figure 4E:
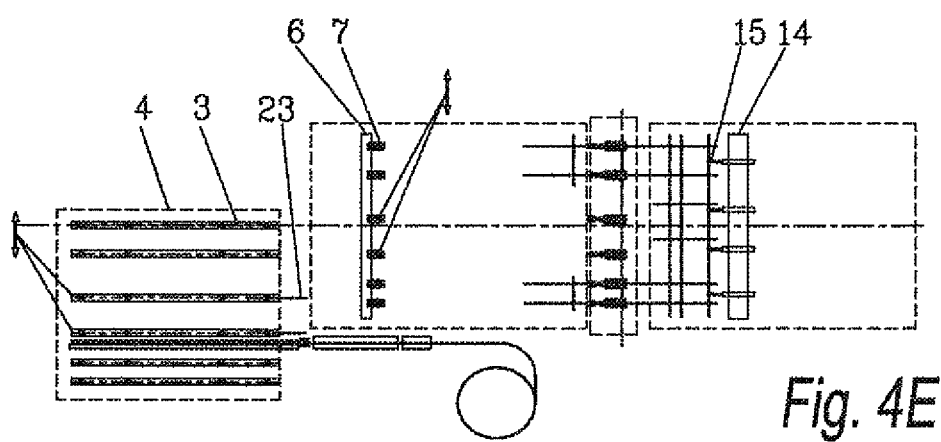
Figure 4F:
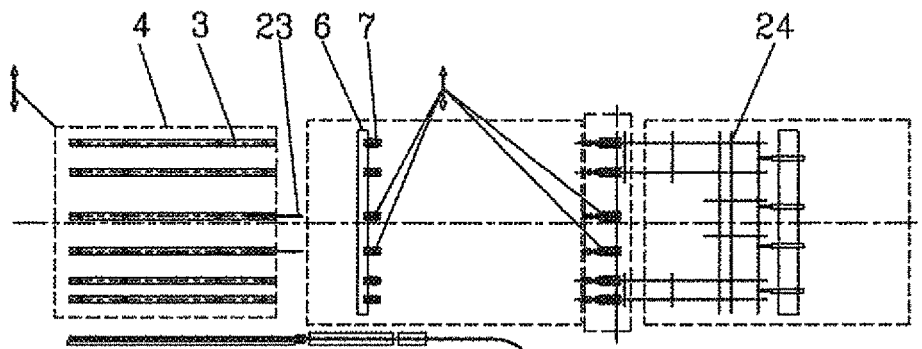
Figure 4G:
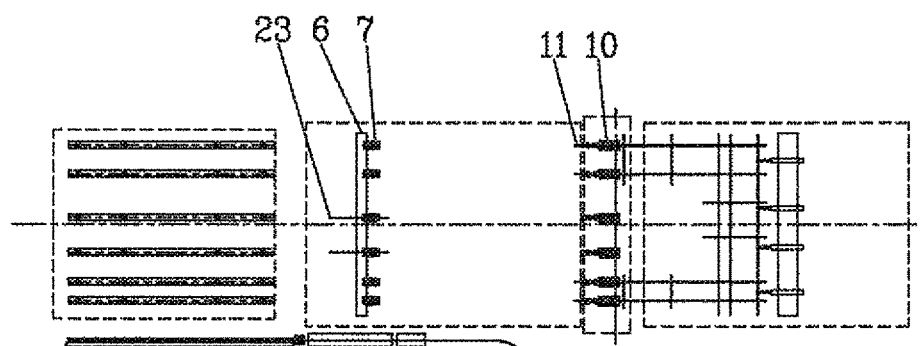
Figure 4H:
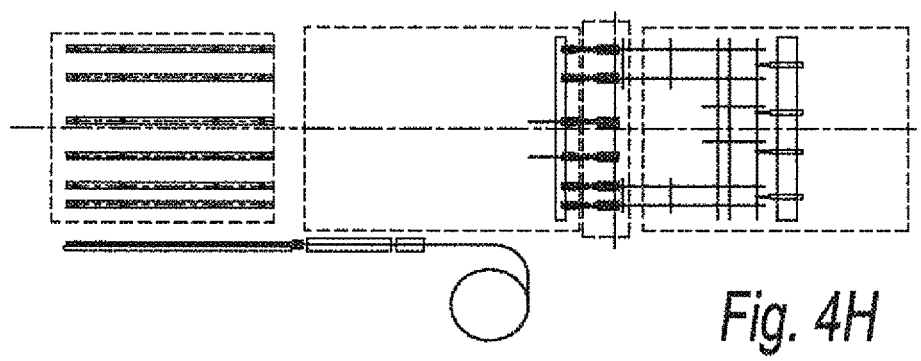
Figure 4K:
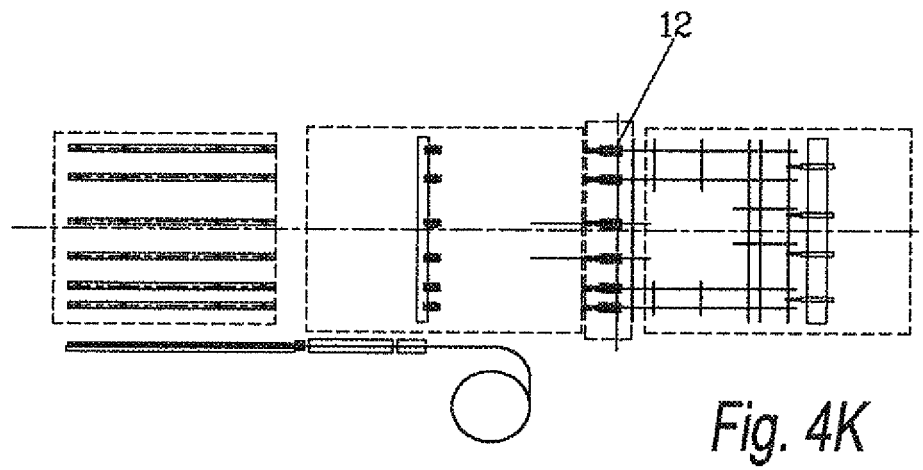
Figure 4L:
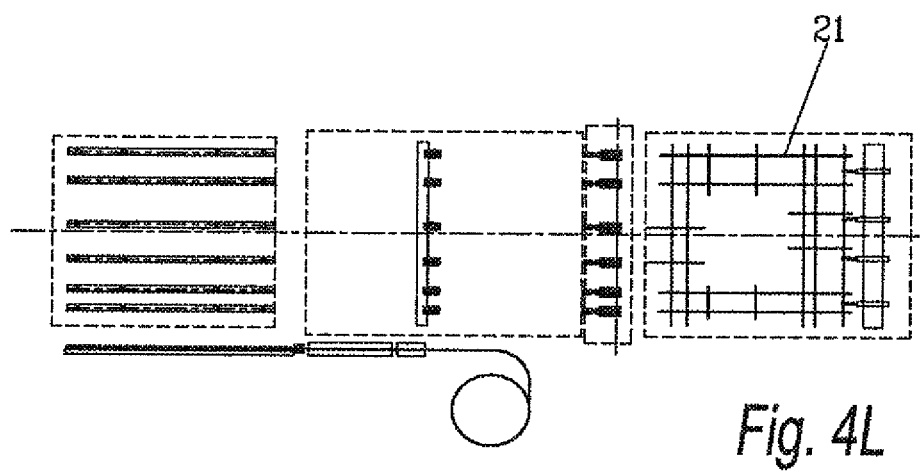
Figure 6:
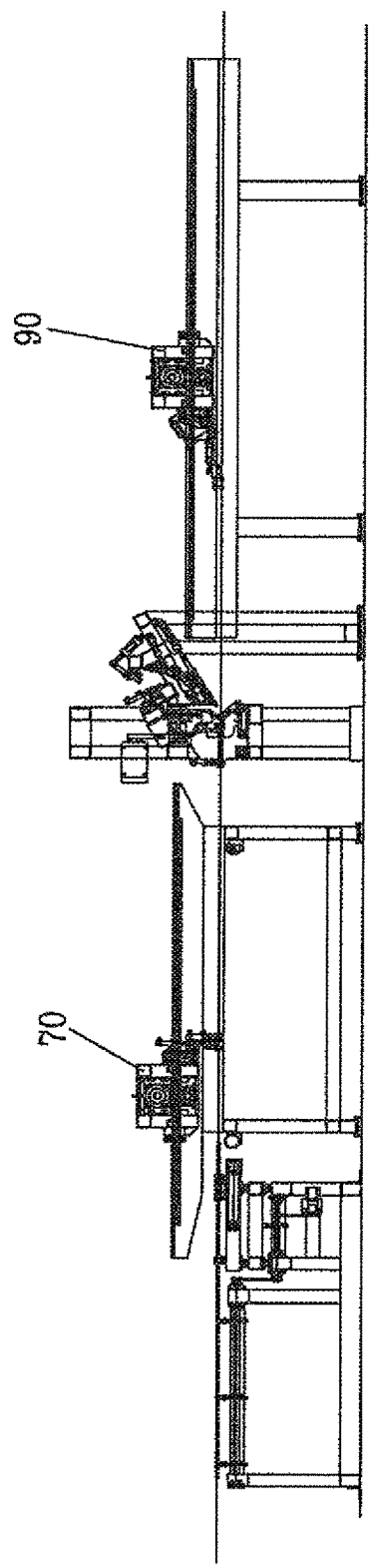
FIG. 6 depicts the machine in side view.
Figure 7B:
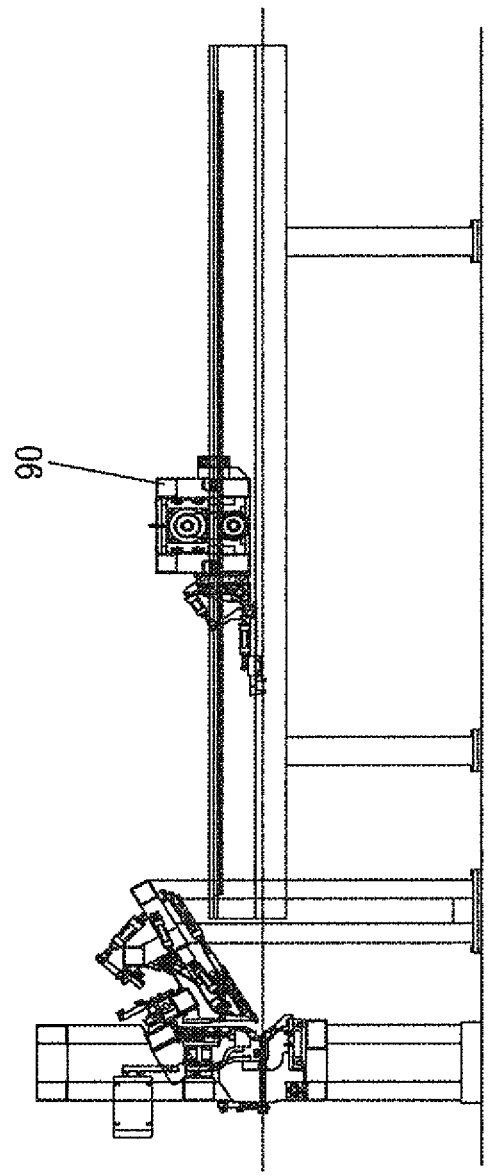
FIG. 7B depicts the second half of the machine in side view.

In the present text, numerous specific details are set forth in order to provide a thorough understanding of exemplary versions of the present invention. It will be apparent, however, to one skilled in the art, that some versions of the present invention may possibly be practiced without some of these specific details. Indeed, reference in this specification to "a variant," "variants," and "one/the variant," or "one version," "a version" and the like, should be understood to mean that a particular feature, structure, or characteristic described in connection with the variant or version is included in at least one such variant or version according to the disclosure. Thus, the appearances of phrases such as "in one variant," "in one version," and the like, in various places in the specification are not necessarily all referring to the same version or variant, nor are separate or alternative versions or variants mutually exclusive of other versions or variants. Moreover, various features may be described which possibly may be exhibited by some variants or versions and not by others. Similarly, various requirements are described which may be requirements for some variants or versions, but not others. Furthermore, as used throughout this specification, the terms 'a', 'an', 'at least' do not denote a limitation of quantity, but rather denote the presence of at least one of the referenced item, in the sense that singular reference of an element does not necessarily exclude the plural reference of such elements. Concurrently, the term "a plurality" denotes the presence of more than one referenced items. Finally, the terms "connected" or "coupled" and related terms are used in an operational sense and are not necessarily limited to a direct connection or coupling.

At this point, it is pointed out that, in the context of the present disclosure and claims, the term "wire" can equivalently be understood as meaning or indicating, in the context of the present disclosure, claims and appended drawings, a wire, rod, or other suitable elongate material of diverse cross-section; as in implementations of the invention the material employed, as well as the dimension of the individual elements, may be commensurate with the requirements of particular applications. Furthermore, the longitudinal wires and the transverse wires may be referred-to in shortened form as the "longitudinal/longitudinals" and as the "transverse," respectively.

According with an exemplary method, the longitudinal wires (1) are deposited in a suitable number of receptacles (2) on carrier (3), a plurality, each one of which should be understood as being a 'receptacle carrier,' and so named. These individual receptacle carriers (3) are seated on the prefeeder carrier (4) (prefeeder carrier), and are carried by it, and are moved thereon independently relative to each other (one relative to another), (although it is possible to position or reposition one or more (or all of them) simultaneously) and transversely to the direction of the longitudinal wires, so as to each respectively assume different relative to one another distances, generally each individual/individually without restrictions.

The prefeeder carrier (4) is likewise movable transversely to the direction of the longitudinal wires from a position, in which occurs the feeding of the longitudinal wires, to another position at the main axis of the machine, along the length of which the longitudinal wires are transported towards the welding heads.

The feeding of longitudinal wires is made along the length of axis (5). The prefeeder carrier (4) is moved so that a selected receptacles carrier (receptacle carrier) is located at the (feeding position of longitudinals) feeding position for longitudinal wire (5). By continued movements (movements, step-wise) of the prefeeder (4) there are deposited corresponding longitudinal wires at certain distances that correspond to the spacings of longitudinal wires in the under production mesh, without restrictions—that is according to controlled selection/choice, generally each individual/individually without restrictions, though in some contemplated versions possibly one or more may be linked as a team for joint/simultaneous movement (or stationary posture) as a subgroup, while the remainder have/retain capability to move/be-positioned each individual/individually without restrictions.

With the conclusion of feeding of longitudinal wires (1) at the receptacle carriers (3) the prefeeder carrier (4) is moved to a suitable position so as to deliver-deliver the longitudinal wires to the feeder carrier (6), this feeder being the main feeder.

The feeder carrier (6) has a plurality of wire grippers (7) activatable each by a respective motor (8), which are controllably movable and positioned, and possibly independently of one another (that is according to controlled selection/choice, generally each individual/individually without restrictions, though in some contemplated versions possibly one or more may be linked as a team for joint/simultaneous movement (or stationary posture), as a subgroup while the remainder have/retain capability to move/be-positioned each individual/individually without restrictions), relative to one another, and transversely relative to the longitudinal wires. Considering the plurality of grippers (7), the exemplary but non-restrictive example of six is schematically depicted in FIG. 1 with the understanding that possibly more than six or less than six may be present and there located available to be employed, depending on a particular desired configuration or application, or mesh to be produced. The grippers (7) of the feeder carrier (6) are displaced to positions that correspond to the longitudinal wires of the mesh that are to be welded.

As depicted, in a preferred version, the grippers (7) have, may assume/take at least two vertical positions, a first position at the level of the produced mesh so that the axis of the corresponding longitudinal wire coincides with the axis of gripper (7); and a second position over the mesh so that gripper (7) does not collide with the underlying longitudinal wire in the case of a second feeding of longitudinal wire during mesh production with different lengths of wires (that is, meshes which include in them different-length wires).

The feeder carrier (6) moves towards the prefeeder carrier (4), receives the longitudinal wires (I) and transports them towards the welding heads (10).

The welding heads (10) are movable independently and transversely to the direction of the longitudinal wires and assume positions corresponding to the positions of the longitudinal wires of the under-production mesh, that is according to controlled selection/choice, generally each individual/individually without restrictions, though in some contemplated versions possibly one or more may be linked as a team for joint/simultaneous movement (or stationary posture) as a subgroup, while the remainder have/retain capability to move/be-positioned each individual/individually without restrictions. They also have gripper (11) for restraining the longitudinal wires.

The longitudinal wires (1) are transported by the feeder carrier (6) towards the welding heads (10) where they are restrained by the grippers (11) on the welding heads. In following the grippers (7) of the feeder open, the feeder carrier (6) moves backwards away from the welding heads (10) to a suitable length, are activated again, the grippers (11) of the welding heads are deactivated and the longitudinal wires are advanced so that the first transverse wire (12) may be welded. By repetition of the advancement of longitudinal wires—under-production mesh, welding of a number of transverse wires sufficient to locate the first transverse wire in a receiving region of the grippers (15) of the mesh carrier (14), the feeder carrier (6) is removed away from the welding heads (10). Subsequently, with continued repetition of movements of longitudinal wires, feeding of transverse wires and welding of transverse wire with longitudinal wires, the mesh is produced.

The produced mesh (20) is pulled from the mesh carrier (14) which has a plurality of grippers (15), the exemplary but non-restrictive example of five being schematically depicted in FIG. 1 with the understanding that possibly more than five or less than five may be present and there located available to be employed, depending on a particular desired configuration or application, or mesh. The grippers (14) are of number sufficient to transport the produced mesh and its longitudinal wires during the duration of mesh production. The grippers (14) are moved transversely and in a controlled manner in the direction of the longitudinal wires (so as to assume or arrive to) and assume suitable positions for the restraining and transport of the mesh. They are controllably positioned and possibly independently of one another (that is according to controlled selection/choice, generally each individual/individually without restrictions, though in some contemplated versions possibly one or more may be linked as a team for joint/simultaneous movement (or stationary posture) as a subgroup, while the remainder have/retain capability to move/be-positioned each individual/individually without restrictions).

The mesh is analyzed into groups analogous to the positions of the longitudinal wires in the entry direction towards welding in the welding heads. The longitudinal wires of each group of wires, are at equal level in the direction transverse to the direction of the longitudinal wires.

The operation of the method is presented through the example of the production of a mesh (21) with openings, Drawing 3B, in the sense of an example. The longitudinal wires of the under-production mesh (21) are analytically categorized into two groups that of (22) of drawing 3C and that of (23) of drawing 3D.

Under operational control, the receptacles carriers (receptacle carriers) (3) at the prefeeder (4), the grippers (7) at the feeder carrier (6) and the welding heads (10) are moved to positions that correspond to the longitudinal wires of the first group longitudinal wires (22), as schematically depicted in Drawing 4A.

By continued movements continuing of the receptacle carriers of the prefeeder (4)—feeding of longitudinal wires (1) there are deposited the longitudinal wires that correspond to the group of longitudinal wires (22), as schematically depicted in Drawing 4B.

The prefeeder carrier (4) transports the receptacle carriers (3) with the longitudinal wires to the axis of the machine for receiving of the longitudinal wires by the feeder carrier (6), as schematically depicted in Drawing 4C.

The feeder carrier (6) delivers the longitudinal wires (22) to the grippers (11) of the welding heads (10), the grippers of the feeder carrier (7) are deactivated, are removed by the carrier a suitable distance from the welding heads (10), the grippers (7) of the feeder carrier are activated, the grippers (11) of the welding heads (10) are deactivated and the longitudinal wires are advanced for a suitable length through the welding heads. Then at this position there is accomplished a welding with the first transverse wire (12) of the mesh. The next step is made with advancement via the grippers of feeder (7). Subsequently, the advancement of the under-production mesh is undertaken by the mesh feeder (14), as schematically depicted in drawings 4D-4E, via its grippers (15) that engage the mesh, preferably at its now-welded first transverse wire.

In continuing production while the transverse wires are welded with the longitudinal wires, the feeder carrier (6) returns proximate to the prefeeder carrier (4) and the grippers (7) of the feeder carrier (6) and the receptacle carriers (3) of the prefeeder carrier (4) are displaced to positions that correspond to the second group of longitudinal wires (23). Subsequently the longitudinal wires of the second group of longitudinal wires are fed, drawing 4E, each to their respective receptacle carrier (3).

The longitudinal wires of the second group of longitudinal wires (23) are transported by the movement of the prefeeder carrier (4) towards the machine axis, indicated by dashed line in the drawings, whereat they are received by the grippers (7) of the feeder carrier (6), drawing 4F.

Upon receipt of the longitudinal wires of the second group longitudinal wires (23) the grippers (7) that will not receive longitudinal wire, that is which are to be/stay idle, via the action of motor (8) are moved out of the plane of the under-production mesh, preferably as in this exemplary version above the level of the under-production mesh, although it stands within the contemplation of the present disclosure that in some possible version or variants artisans of ordinary skill in the art shall readily understand that the structures of the grippers (7) and their supports may have dimensions that instead permit a relocation/repositioning movement out of the plane and thus instead/alternatively— under this level of the under-production mesh, so as to not collide with the other longitudinal wires of the first group longitudinal wires (22), which are still within the welding heads. The location of the grippers is, for example, presented in indicative manner in drawings 2A, 2B, they may for example assume such pattern of positions as indicated in exemplary form here.

The longitudinal wires of the second group longitudinal wires (23) are transported towards the welding heads (10), drawing 4G.

The longitudinal wires of the second group longitudinal wires (23) are received by the grippers (11) of the welding heads (10), drawing 4H The longitudinal wires of the second group longitudinal wires (23) are welded with transverse wires for completion of the mesh, drawing 4K.

With the conclusion of welding of the transverse wires the completed mesh (21) is delivered, drawing 4L.

The longitudinal wires may be of the same or differing diameters.

The transverse wires may be of the same or differing diameters.

Both the longitudinal wires as well as the transverse wires may be supplied from reels, may be straightened and cut, controllably to appropriate desired/specified lengths, but may possibly be precut to suitable desired/appropriate lengths and be fed to the welder.

It should be readily understood that in versions within the scope of the present disclosure the transverse wire may be welded from one side of the longitudinal wires, or from the under part of the longitudinal wires.

In the case where the longitudinal wires are of different diameters of significant for example large differences, the welding heads may be moved perpendicularly to the level of the mesh, so as to adjust the welding electrodes to the level of the wires of the mesh. Some versions within the scope of the present disclosure may include this feature as an option that increases the flexibility and versatility of the machines and processes set forth.

Figure 8A:
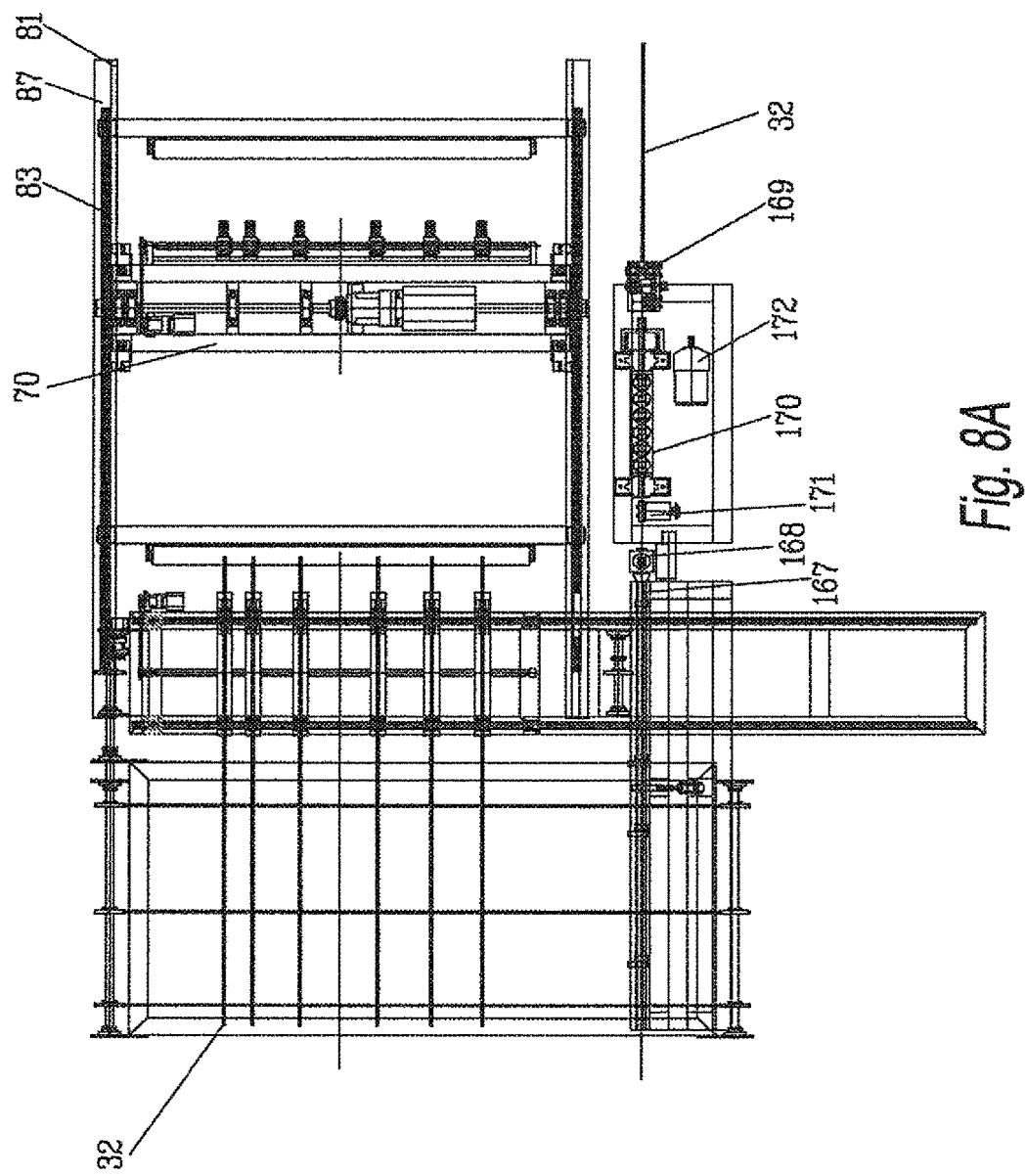
FIG. 8A depicts in magnified view the first half of the machine in top view.
Figure 11A:
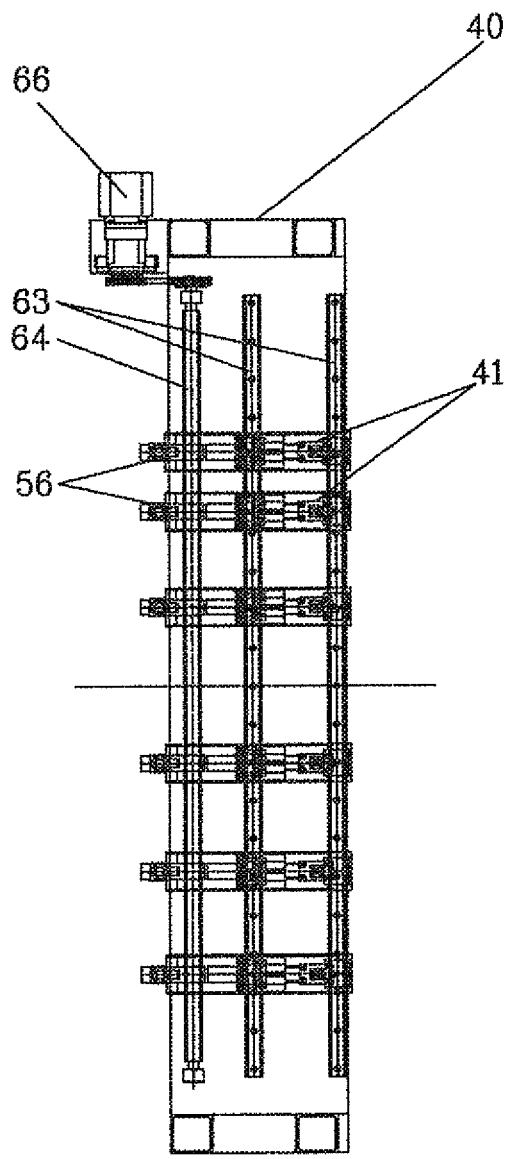
FIG. 11A depicts the welding heads in top view.
Figure 11B:
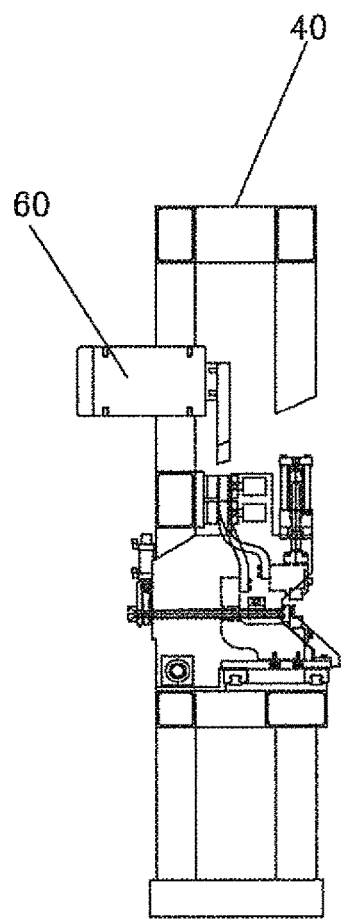
FIG. 11B depicts the welding heads and their base in side view.
Figure 11C:
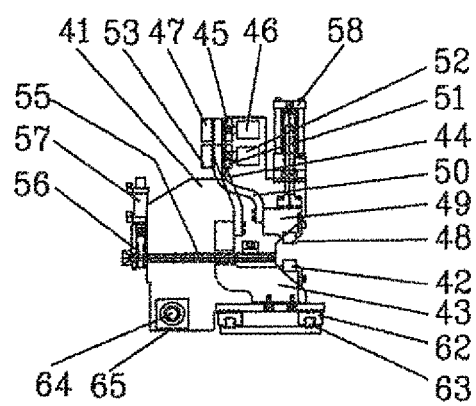
FIG. 11C depicts a single welding head in side view.
Figure 11D:
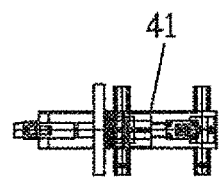
FIG. 11D depicts a single welding head in top view.
Figure 12A:
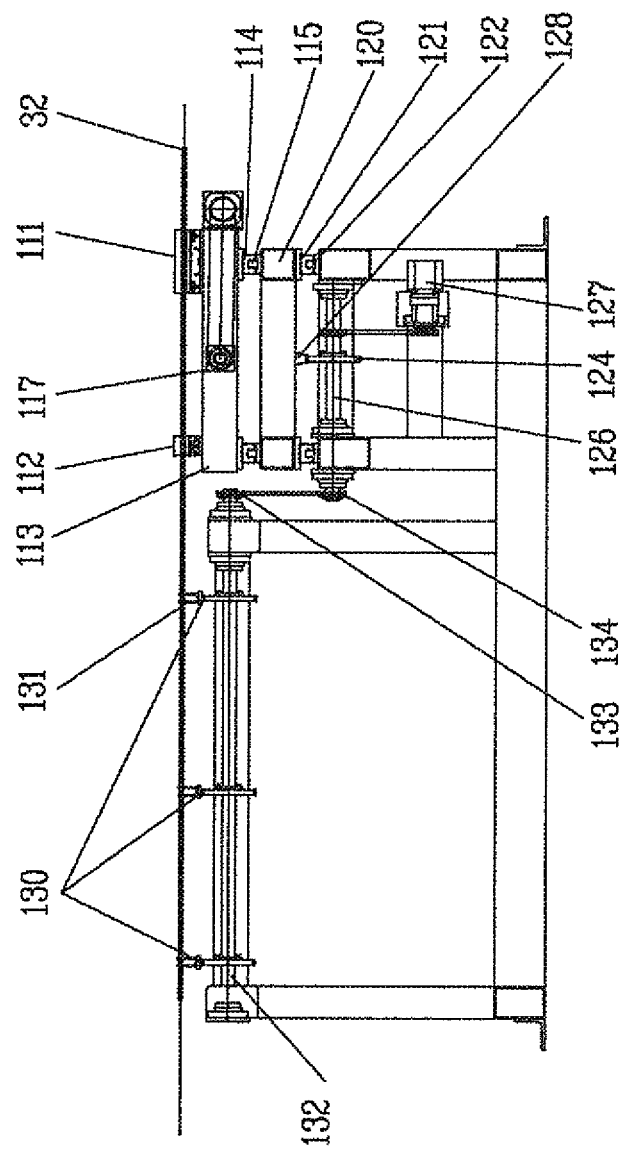
FIG. 12A depicts the prefeeder carrier in side view.
Figure 12B:
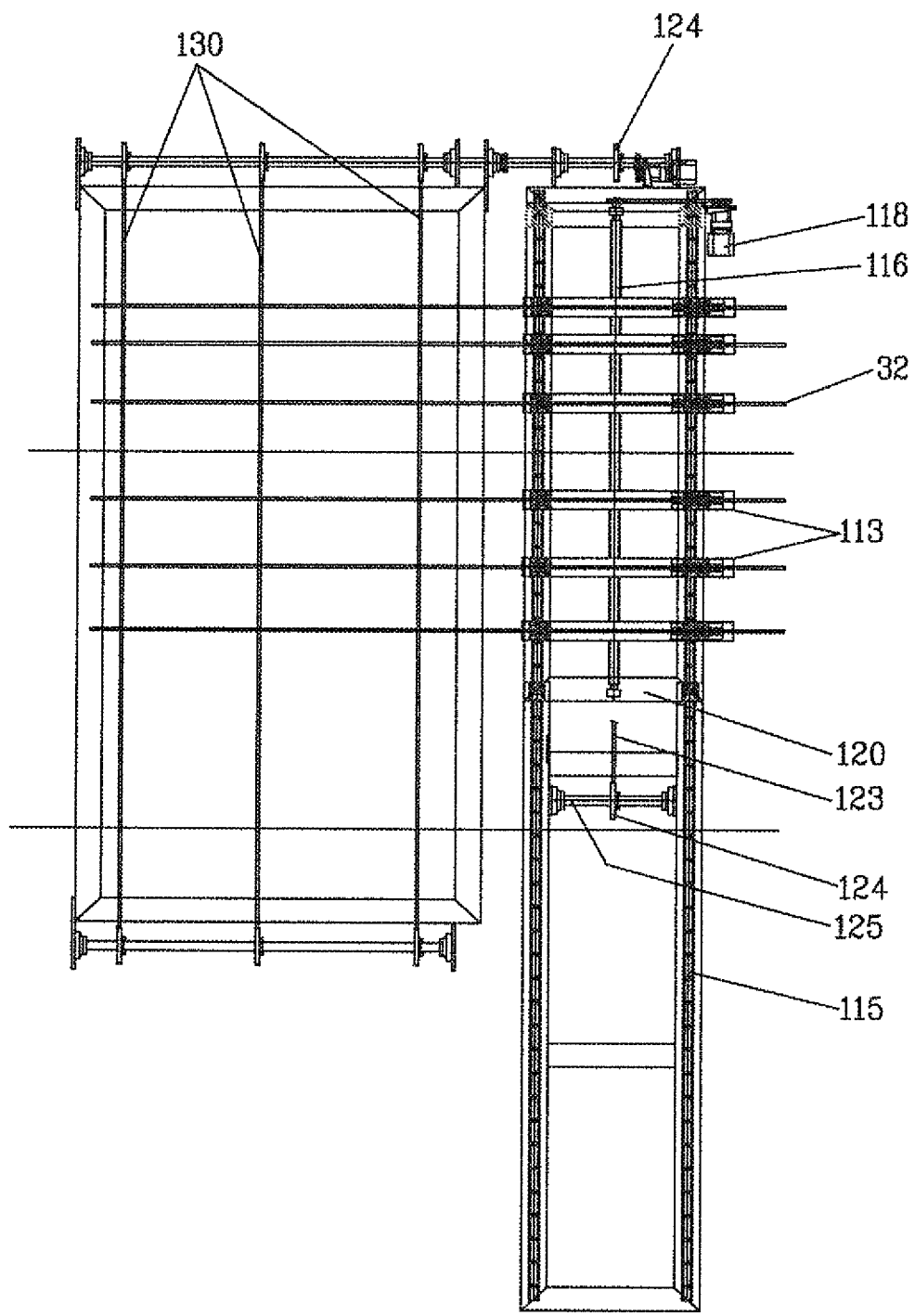
FIG. 12B depicts the prefeeder carrier in top view.

In the system described in following there is presented an implementation of the method previously referred to, in an exemplary sense, The welder (40) (FIGS. 5, 8B) comprises an appropriate number of welding heads (41) (FIG. 11C) which have the possibility of moving in a direction perpendicular to the longitudinal wires (32) in the direction of the transverse wires according to controlled selection/choice, generally each individual/individually without restrictions, though in some contemplated versions possibly one or more may be linked as a team for joint/simultaneous movement (or stationary posture) as a subgroup, while the remainder of the plurality have/retain capability to move/be-positioned each individual/individually without restrictions. Considering the plurality of welding heads (41), the exemplary but non-restrictive example of six is depicted in FIGS. 4,5, 8B with the understanding that possibly more than six or less than six may be present and there-located available to be employed, depending on a particular desired configuration or application, or mesh.

The welding head comprises the following elements. A stationary electrode (42), mounted on a copper base (43), which is connected via a flexible conductor (44) with the electrical contact (45).

A movable electrode (48), mounted on a copper base (49), which is connected via a flexible conductor (50) with the electrical contact (51).

The movable electrode and its copper base are movable by a (by the action of a) cylinder (58), which is activated via a valve.

The longitudinal wires pass through guide (55) through the copper base (43) of the lower electrode.

At the entrance for the longitudinal wire into guide (55) there is present gripper (56) activatable by cylinder (57).

The electrical contact (45) of the stationary electrode (42) is moved by cylinder (46) transversely to the electrical conductor (53). Between the electrical conductors there is extant electrical voltage sufficient to weld the/a transverse wire with the/a longitudinal wire. The voltage between the two conductors (47), (53) is produced by at least one welding transformer (60), the phases of which are connected with the supply conductors (47), (53). The number of welding transformers depends on the welding power required for the simultaneous welding at more than one locations. Given more transformers the number of transformers which is activated at welding depends upon the required electric power.

In the depicted version, the welding head (41) is mounted on preferably two linear slide blocks (62), for its movement on linear guides (63) transversely to the longitudinal wires. Equivalent variants may employ other types of bearings, for example possibly such as linear ball (bushing) bearings, profile rail-type linear guides, roundrail linear guides (see for example www.thomsonlinear.com). The exemplary version with two bearings should be understood in a non-limiting sense as a preferred version, since either one, or possibly more than two bearings may possibly be employed depending on a particular configuration, as shall be understood by readers of ordinary skill in the technology.

The welding head (41) is movable by at least one linear screw drive for example as the depicted drive screw (64), the rotation of which is converted into linear movement of the welding head (41) through a rotary nut and an electrical clutch (65). With rotation of the drive screw (64) there are moved only those welding heads (41) having their respective clutches (65) activated to restrain the rotary nut from rotating relative to the welding head. The drive screw (64) is driven by an electrical motor (66).

The feeder carrier (70) has a plurality of grippers (72), that are movable along the length of carrier (70) and transversely to the direction of the longitudinal wires (32).

The longitudinal wire enters is introduced through the entry guide (71) and passed through the gripper (72). The gripper is activated by pneumatic cylinder (73), which also holds the longitudinal wire (32) inside the gripper (72).

The gripper (72) with the entry guide (71) and the pneumatic cylinder (73) are mounted on guide (74) and are movable by the action of a pneumatic cylinder (75) or fluid-power cylinder. The grippers may, by the action of the pneumatic cylinder, be located in at least two positions, one at the feeding line of the welding heads at the axis of the longitudinal wires ($\alpha$-$\alpha'$) and one higher than the longitudinal wires ($\beta$-$\beta'$) that shall produce the mesh.

The guide (74) is mounted on plate (76) which, in turn, is mounted on two linear slide blocks (77), for their linear displacement transversely relative to the longitudinal wires. Equivalent variants may employ other types of bearings, for example possibly such as linear ball (bushing) bearings, profile rail-type linear guides, roundrail linear guides (see for example www.thomsonlinear.com). The exemplary version with two bearings should be understood in a non-limiting sense as a preferred version, since in some variants either one, or possibly more than two bearings may possibly be employed depending on a particular configuration, as shall be understood by readers of ordinary skill in the technology.

The movement of grippers (72) is effected via the rotary nut of electric clutch (79) which through electrical command engages the rotation of the drive screw (78) with the linear motion of the gripper (72). While the drive screw is rotating there are moved the grippers (72) having their respective clutches (79) activated to restrain the rotary nut from rotating relative to the welding head. The drive screw is rotated by motor (88).

The grippers with the linear slide blocks, their guides, the guide screw and its motor are mounted on carrier (70) that has at its ends guide carriage (80) and moves linearly on guides (81). In the exemplary version depicted, the movement of the carrier is implemented with toothed gears (82), toothed rack (83), with the toothed gears (82) being mounted on shaft (84) and movable by electrical motor (85).

The mesh carrier (90) transports the under-production mesh (31) and forms the step for the welding of the transverse wires by its advancements as can be understood considering FIG. 8B.

Figure 9B:
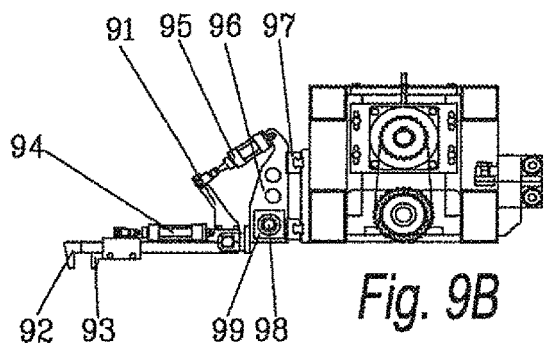
FIG. 9B depicts the mesh carrier in side view.
Figure 9C:
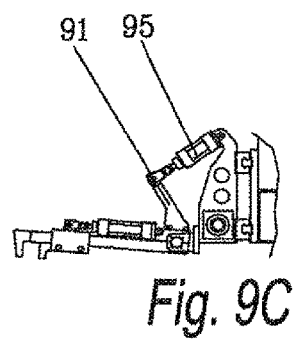
FIG. 9C depicts a portion of the mesh carrier with the grippers raised.
Figure 9A:
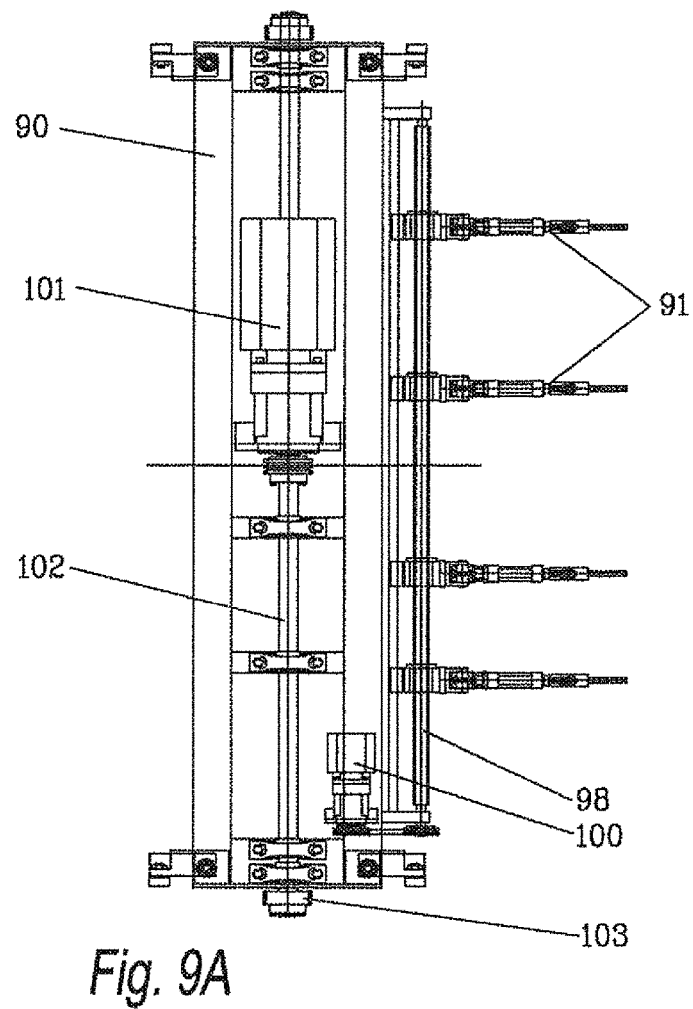
FIG. 9A depicts the mesh carrier in top view.
Figure 10B:
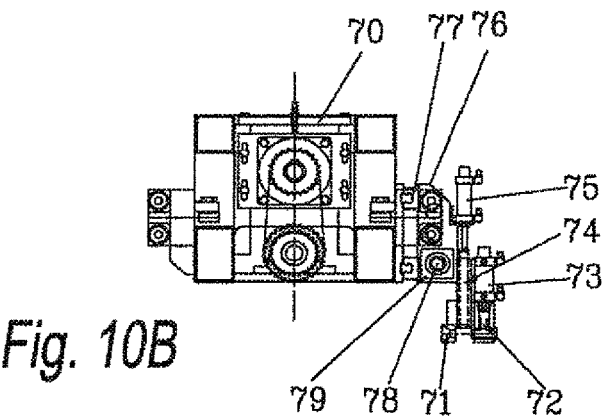
FIG. 10B depicts the feeder carrier in side view.
Figure 10C:
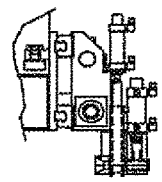
FIG. 10C depicts the gripper of the feeder carrier.
Figure 10D:
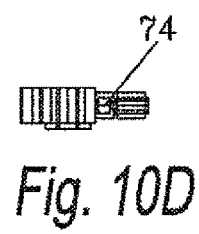
FIG. 10D depicts the gripper of the feeder carrier in top view.
Figure 10A:
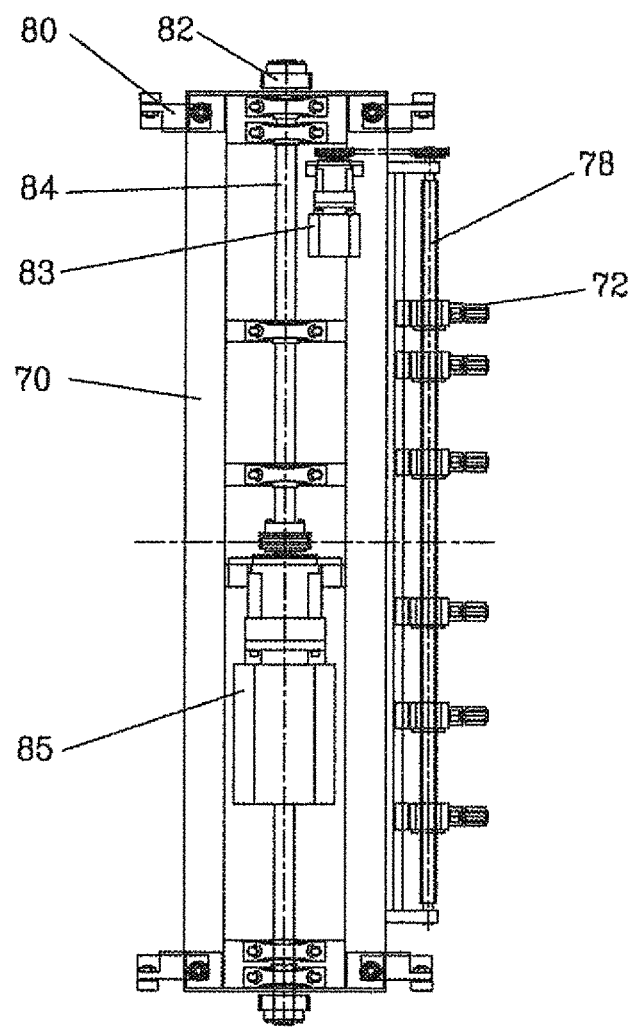
FIG. 10A depicts the feeder carrier in top view.

It has a plurality of grippers (91) which are movable along the length of the carrier and transversely to the longitudinal wires of the mesh. An exemplary (FIGS. 9A-9C) gripper has the stationary clamp part (92) and the movable clamp part (93) movable by the action of pneumatic cylinder (94), thus preferably a fluid-power motor, which for example possibly may additionally or instead utilize hydraulics. The two grippers (92), (93) and the pneumatic cylinder (94) are mounted on a joint so that the clamp parts' spot may be located in two operational positions, one in the region of the transverse wire so as to be able to restrain it and one over the level of mesh. This motion, between the two operational positions, is implemented with pneumatic cylinder (95). The clamp parts (92), (93) the pneumatic cylinder (94) and the pneumatic cylinder (95) are mounted on base (96) that in turn is mounted on two linear slide blocks (97) and are movable with the rotation of drive screw (98). Equivalent variants may employ other types of bearings, for example possibly such as linear ball (bushing) bearings, profile rail-type linear guides, roundrail linear guides (see for example www.thomsonlinear.com). The exemplary version with two bearings should be understood in a non-limiting sense as a preferred version, since in some variants either one, or possibly more than two bearings may possibly be employed depending on a particular configuration, as shall be understood by readers of ordinary skill in the technology.

The rotation of the drive screw is converted into linear motion through rotary nut and electrical clutch (99). At the rotation of the drive screw (98) there are moved those grippers having their respective clutches activated to restrain the rotary nut from rotating relative to the welding head.

The drive screw (98) is rotated by motor (100). The mechanisms of the grippers, the drive screw and its motor are mounted on carrier (90) that moves along the length of the longitudinal wires on guides. An electrical motor (101) rotates a shaft (102) at the ends of which are mounted two toothed gears (103) engaged with the racks (104) on the bases of carriers (105). With the rotation of the electrical motor (101) the mesh carrier (90) moves.

The longitudinal wires are delivered from the production unit to the prefeeder (110) which described in following.

Wire (32) is deposited at double receptacles (111) and single receptacles (112) in which it is restrained by retainers/restrainers, preferably magnets. Other equivalent forms of retainers/restrainers for retention, such as spring sheaths or clamping digits may equivalently be employed in variants. One at least double receptacle (111) and additional single receptacles (112) are located on a carrier (113) which is mounted on linear slide blocks (114) and is movable on linear guides (115) by rotary drive screw (116) through rotary nut and electrical clutch (117), in this regard in similar manner to that previously described in this description. The number of receptacle carriers (113) corresponds to the number of grippers (72) of the gripper carrier (70) and to the number of welding heads (41). The rotary drive screw (116) is driven by electrical motor (118). The linear guides (115) of slide blocks (114) are mounted on frame (120) which is also a carrier and is mounted on linear slide blocks (121) on linear guides (122). Equivalent variants may employ other types of bearings, for example possibly such as linear ball (bushing) bearings, profile rail-type linear guides, roundrail linear guides (see for example www.thomsonlinear.com). The exemplary version with two bearings should be understood in a non-limiting sense as a preferred version, since in some variants either one, or possibly more than two bearings may possibly be employed depending on a particular configuration, as shall be understood by readers of ordinary skill in the technology.

In the depicted version, this prefeeder carrier (120) is movable by the action of chain (123) which moves on chain gears (124). These chain gears are mounted on axes (125), (126) and are movable by motor (127) through a transmission with chain. The carrier is mounted on the chain through connection (joining/linking connector) (128). By the action of motor (127) the carrier (120) with the carriers (113) on it situated transversely is moved. This movement is towards the longitudinal wires from the longitudinal wires' loading position towards-to the region of rendering of the longitudinal wires to the feeder carrier—towards the region of receipt by the feeder carrier (70).

The carriers with the receptacles (113) have small lengths compared (relative to) to the lengths of the longitudinal wires. To the rear of the prefeeder carrier (120) there is present a number of chains (130) that have suitably formed receivers (131) at the same level with the receptacles' bases (111) and (112). The chains are movable by the shaft (132) rotated by chain gear (133), (134) transmission by shaft (126). The motor (127) simultaneously drives the carrier (120) and the chains (130) with the same linear velocity.

The wires deposited on receptacles/receivers (111), (112) and chains (130) are movable parallel to themselves from the feed spot towards the receiving region of the mesh carrier (70).

Transverse wire (33) is pulled from coil (138) at reel (139) and guided to prestraightener (140), straightened with rotor straightener (141), passed through exit and measuring rollers (142), guided towards cutter (143) and subsequently to collector (144). Rotor straightener (141) has rollers, straightens and advances the wire and is rotated by motor (137). Wire is advanced, measured and cut to planned length at cutter (143). Subsequently collector (144) opens and the wire descends by gravity to position (145). At position (145) pneumatic cylinder (146) is activated to urge gripper (147) with magnets (148) towards the wire to restrain it. The gripper (147) with magnets (148) is mounted on carrier (149) which is movable by belt (150) and motor (151) parallel to the transverse wires. The wire is transported by gripper (147) in parallel to the transverse wires to a position that corresponds to the production of the mesh.

Flap (152) opens by the action of fluid power or pneumatic cylinder (153) and the transverse wire is guided to position (154). By the action of fluid power or pneumatic cylinder (155), flap (156) is rotated and the wire descends from position (154) to position (157) whereat it is restrained with the beam springs (158). Push rods (159) push the wire from position (157) by action of cylinder (160), towards welding heads (41) and specifically, on the lower welding electrode (42) where the wire is restrained by magnets.

Longitudinal wire (32) is pulled from spool (165) on reel (166), is guided towards straightening machine and subsequently towards the collector (167) through cutter (168). The straightening machine comprises entry rollers (169), rotor straightener (170) and the exit and measuring rollers (171). Rotor straightener is rotated by motor (172).

The wire is advanced by rotor straightener (170), the advanced length of wire is measured and when the planned length is produced the cutter (168) cuts is into the collector (167). By opening of the collector (167) the wire is deposited on a receptacles carrier (113) having one double receptacle (111) and one single receptacle (112). Subsequently, the next carrier, likewise having/with double and single receptacle receptacles/receivers is advanced to the position of deposition for longitudinal wires, the new wire that has been advanced at the longitudinal wire collector is deposited, with this procedure continuing until completion of production of all of the longitudinal wires.

The machine operation has as follows:

According to the method, the longitudinal wires of the subject-to-production mesh are analytically categorized into groups of longitudinal wires they are so segregated/grouped based on analysis of the mesh to be produced.

For the feeding of a group of longitudinal wires the receptacle/receiver carriers (113) having the double (111) and the single (112) gripper are displaced relative to one another, as necessary mutually and with respect to each other, by action of motor (118) of screw (116) and the clutches (117), in a suitable fashion so as to correspond to the relative, desired distances of longitudinal wires relative to one another.

The grippers (72) of feeder carrier (70) are displaced relative to one another, and with respect to each other, by the action of motor (88), screw (78) and clutches (79), so as to correspond to positions of the longitudinal wires in the subject-to-production mesh.

Likewise, the welding heads (41) are displaced relative to one another as necessary mutually and with respect to each other by the action of motor (66) of screw (64) and clutches (65)—and assume positions that correspond to the longitudinal wires of the subject-to-production mesh.

The grippers (91) of the mesh carrier (90) are displaced by the action of motor (100), of screw (98) and clutches (99) to appropriate programmed positions for receiving the mesh by the (so that the) restraint of the first transverse wire (occurs/is effected) in-between the longitudinal wires of the mesh The prefeeder carrier (120) with the receptacles carriers (113) is transported by the action of motor (127) towards the position of deposition of longitudinal wires. By continued feeding of longitudinal wires and displacements of carrier (120) the group of longitudinal wires is supplied, all of them so that the particular set/group of longitudinal wires is laid out. Then, the prefeeder carrier (120) is displaceable towards the position for rendering the longitudinal wires to the feeder carrier (70), as a set/group.

The feeder carrier (70) is movable by the action of motor (85) towards the prefeeder carrier and the ends of the longitudinal wires enter into the grippers (72) of the feeder carrier. Cylinders (73) of grippers (72) are activated and receive the longitudinal wires, which they also transport towards the welding heads.

The longitudinal wires (32) enter into the welding heads (41) and the grippers (56) on the welding heads are activated, grippers (72) of the feeder carrier are deactivated and it is displaced backwards a programmed length, the grippers (72) of the feeder carrier (70) are activated, grippers (56) of the welding heads (41) are deactivated and the feeder carrier (70) advances the longitudinal wires to position corresponding to a welding of the first transverse wire.

In parallel the first transverse wire (33) has been produced at the straightening unit for the transverse wires, and is advanced by the push rods (159) onto the longitudinal wires inside the welding heads (41).

At activation of the cylinders (58) of the welding heads at which longitudinal wires are present, the transverse wire is pressed on the longitudinal wires, cylinders (46), (52) are activated so as to move electrical contacts (45). (51) on the supply conductors (47), (53), welding transformers (60) are activated and the welding of the transverse wire with the longitudinal wires is executed.

The feeder carrier (70), with grippers (72) and the grippers (56) of the welding heads (41), advances the longitudinal wires and the welded transverse wire at the distance of the first from the second transverse wire. The already produced transverse wire is fed onto the longitudinal wires at the welding heads and welding of the second transverse wire is implemented.

In parallel the mesh carrier (90) is moved and the grippers (91) of the mesh carrier are lowered by action of cylinder (95), closing by action of cylinder (94) and the mesh carrier (90) now takes over the advancement of the under-production mesh, with the simultaneous deactivation of grippers (72) of feeder carrier (70) and of grippers (56) of welding heads (41).

With sequential advancements of the under-production mesh and feeding of transverse wires the first group of the mesh is produced.

Simultaneously to mesh production the receptacles carriers (113) are displaced to positions that correspond to positions of the longitudinal wires of the second group of longitudinal wires. The prefeeder carrier (120) is displaced towards the longitudinal wires feeding position whereat feeding of the second group of longitudinal wires is made, in similar fashion to that already described. When the feeding of the second group of longitudinal wires completes the carriers (113) with the longitudinal wires are transported towards the position for receiving longitudinal wires from the feeder carrier (70).

In parallel with the feeding of longitudinal wires and the production of the first group of the mesh the grippers (72) of the feeder carrier (70) are displaced to positions that correspond to the longitudinal wires of the second group of longitudinal wires and the feeder carrier (70) is displaced towards the receiving of the produced longitudinal wires.

Upon completion of the production of the first group of the mesh, the welding heads that do not have wire within this first group are moved to positions that correspond to the longitudinal wires of the second group of longitudinal wires.

Receipt of these longitudinal wires by the corresponding grippers (72) of the feeder carrier (70) and their transport towards the welding heads (41), follow.

By following the procedure of the first group the new transverse wires are welded with the longitudinal wires, and mesh production continues.

By continued advancements of the groups of longitudinal wires, mesh production is completed.

Advantages

The machine produces standardized mesh, special mesh, mesh that may have/with openings; that may have/with different distances among the longitudinal wires, in a generally unrestricted way without restrictions; and transverse wires in programmable dimensions.

The machine may produce mesh of different dimensions one after the other without any impact on productivity.

The machine is exceptionally flexible in changing the diameter of the longitudinal wire.

The machine may select the diameter of the longitudinal from different reels, provided there are corresponding feeding lines for longitudinal wires, one for each wire.

The machine may be fully automated and controlled through computer.

Thus there have been described exemplary methods for producing mesh with openings, from wires or rods, according to which the mesh is produced from longitudinal wires and transverse wires, with the longitudinal wires being fed to a carrier for longitudinal wires, with the transverse wires being fed to the welding line, the mesh being produced by the welding of the transverse in wires onto the longitudinal wires. The mesh (21) is analytically categorized into groups of longitudinal wires and transverse wires, the longitudinal wires being grouped according to the possibility of their simultaneous feeding towards the welding line, the transverse wires being analytically categorized per line of welding, wherein in a line of welding there may correspond more than one transverse wire, the longitudinal wires are fed in groups to receptacles/retainers (2) on carrier (3), which are movable on the prefeeder carrier (4) without restrictions so as to correspond to the longitudinal wires of the corresponding group of longitudinal wires, then the longitudinal wires are rendered from the prefeeder carrier (4) to the feeder carrier (6), which feeder carrier (6) has grippers (7) movable without restrictions generally in an unrestricted fashion, so as to be adjustable to the positions of the longitudinal wires of the group of longitudinal wires, and transports the longitudinal wires of the group of longitudinal wires towards the welding heads (10), which welding heads (10) are movable relative to one another without restrictions so as to correspond to positions of the longitudinal wires in a group of longitudinal wires, the longitudinal wires are advanced towards the welding heads (10) where they are welded with the first group of transverse wires, there follow an advancement from the feeder carrier (6) and, the second welding of transverse wires subsequently the advancement of the under-production mesh is assumed by the mesh carrier (14), which has grippers (15) that are movable in a transverse direction relative to the longitudinal wires so that they may receive the under-production mesh, with continued advancements of the under-production mesh and depositions of transverse wires the production of the first group of longitudinal wires is completed, and with repetition of the procedure for all the groups of longitudinal wires, the production of mesh (21) is completed.

Optionally according to such methods for producing mesh with openings, from wires or rods, during the duration of production of a group of wires of the mesh, the grippers of the feeder carrier (7) and the positions of receptacles carriers of the prefeeder (3) are rearranged according to the longitudinal wires of the next group of longitudinal wires and the longitudinal wires of the second group of longitudinal wires are fed to the receptacles carriers (3) of the prefeeder (4).

Also optionally according to such methods for producing mesh with openings from wires or rods, the longitudinal wires may come from a coil, being straightened and cut to suitable lengths, or may be precut and fed in appropriate sequence to the prefeeder of longitudinal wires.

Also optionally according to such methods for producing mesh with openings from wires or rods, the transverse wires may come from a coil, being straightened and cut to suitable lengths, or may be precut and fed in appropriate sequence to the welding heads.

Also optionally according to such methods for producing mesh with openings from wires or rods, the longitudinal wires may have different diameters.

Also optionally according to such methods for producing mesh with openings from wires or rods, the transverse wires may different diameters, per line of transverse wires and as well segments of transverse wires in a line of transverse wires may have different diameters.

Also optionally according to such methods for producing mesh with openings from wires or rods, each transverse wire is fed and transported to the position corresponding to a line of transverse wire, in the case of plural segments of transverse wire per line they are fed and transported to the positions that correspond to the line of transverse wire.

Also optionally according to such methods for producing mesh with openings from wires or rods, each longitudinal wire of a group of longitudinal wires is received by a gripper (7) on the feeder carrier (6), which has two positions, one at the level of the longitudinal wires and one out of (e.g., over) the level of the longitudinal wires so as to be in position to transport a group of longitudinal wires towards the welding line even though there are present other longitudinal wires already welded in the under-production mesh.

Thus there have described exemplary systems for producing mesh with openings, from wires or rods, according to which the longitudinal wires are fed to receptacles of a prefeeder, are received by a feeder carrier and transported towards the welding heads, where they are welded with the fed transverse wires, with the produced mesh being received by a mesh carrier, and where the prefeeder carrier (120) has (receptacle carriers) receptacles carriers (113), which are movable in the direction of the transverse wires, the prefeeder carrier (120) with receptacles carriers (113) is movable along the direction of the transverse wires, grippers (72) of the feeder carrier (70) are movable in the direction of the transverse wires, the welding heads (41) are movable in the direction of the transverse wires.

the grippers of the mesh carrier are movable in the direction of the transverse wires, the positions of the receptacle carriers (113) of the prefeeder carrier, of grippers (72) of the feeder carrier and of the welding heads (41) are changed (are changed, adjusted) and correspond to the positions of the longitudinal wires of the group of longitudinal wires that is to be welded.

Optionally in such systems for producing mesh with openings, from wires or rods, for the feeding of a group of longitudinal wires initially there are moved the receptacle carriers (113) of the prefeeder carrier (120), the grippers (72) of the feeder carrier (70) and the welding heads (41) to positions corresponding to the longitudinal wire positions, subsequently the longitudinal wires are fed with sequential supplies from the straightening machine and movements of the prefeeder carrier, there follows a transporting of the longitudinal wires by the prefeeder carrier (120) to a position for receiving from the grippers (72) of the feeder carrier (70), the grippers (72) of the feeder carrier (70) receive the longitudinal wires and transport them to the welding heads (41), the longitudinal wires are restrained by the grippers (56) on the welding heads, the grippers (72) of the feeder (70) release, the feeder is removed a specified distance, grippers (72) of feeder (70) are activated, the grippers of welding heads (56) are opened, the longitudinal wires are advanced through the welding heads, the first transverse wire is fed and welded on the longitudinal wires, a second advancement of the longitudinal wires and the welded transverse wire follows, at a step of the mesh, the second transverse wire is fed and welded with the longitudinal wires, the mesh carrier (90) approaches the first transverse wire, the grippers (91) of the mesh carrier (90) are moved so as to be in suitable positions for a pulling of the under-production mesh, and hold the mesh, with continued advancements of the under-production mesh by the mesh carrier (90) and feeds of transverse wires the first group of the mesh is produced.

Optionally in such systems for producing mesh with openings, from wires or rods, with continued advancements of groups of longitudinal wires—weldings with corresponding transverse wires there is produced the programmed mesh.

Optionally in exemplary systems for producing mesh with openings, from wires or rods, according to the preceding three paragraphs, the grippers (72) of the feeder carrier (70) have a gripper (72) activated by a pneumatic cylinder (73), the gripper (72) with the entry guide (71) and the cylinder (74) are mounted on a guide (74) and are movable by the action of pneumatic cylinder (75) so as to have two positions, one at the level of the movement of the longitudinal wires and one out of (e.g., over) the longitudinal wires, so as to be able to feed longitudinal wires towards the welding heads (41) although in other welding heads there are already present longitudinal wires.

Optionally in exemplary systems for producing mesh with openings, from wires or rods, according to the preceding three paragraphs, the longitudinal wires are fed to a double receptacle (111) and to a single receptacle (112) on a receptacles carrier (113) and the receptacles carriers (113) are located on prefeeder carrier (120) which also is movable transverse to the direction of longitudinal wires, the movement of the prefeeder carrier (120) follows a number of chains (130) that are movable through transmissions and have the same linear speed with the prefeeder carrier (120), the number of chains depending on the length of the longitudinal wires of the mesh.

Optionally in exemplary systems for producing mesh with openings, from wires or rods, according to the preceding three paragraphs, each transverse wire may be welded at any location on the longitudinal wires transported by gripper with magnet (147), which is activated by cylinder (146) and is moved by motor (151) via the belt (150).

Generally Regarding the Scope of Protection

The present invention is not limited in any manner to the described and drawings-depicted implementation, but may be realized in many forms and dimensions without abandoning the region of protection of the invention.

In the implementation of the invention the materials that are used and also as well the dimensions of the individual elements may be according to the demands of a particular construction.

In every claim, wherein technical characteristics are referred to and are followed by reference numbers, these are included solely to increase the comprehension of the claims and in this manner the reference numerals do not affect the consideration of the elements, which are exemplarily recognizable by them.

Generally regarding the scope of protection of the appended claims, it should be understood in the context of the preceding discussion that the present invention is not limited in any manner to the described and drawings-depicted implementations, but may be realized in many forms and dimensions without abandoning the region of protection of the invention. For example, in implementations of the invention the materials that are employed and also as well the dimensions of particular elements may be according to the demands of a particular construction. Thus, in closing, it should be noted that the invention is not limited to the abovementioned versions and exemplary working examples. Further developments, modifications and combinations are also within the scope of the patent claims and are placed in the possession of the person skilled in the art from the above disclosure. Accordingly, the processes and systems described and illustrated herein should be understood to be illustrative and exemplary, and not necessarily limiting upon the scope of the present invention. Furthermore, in every claim, wherein recitation may be followed by reference numbers or labels, these are included solely to increase the understandability of the claims, and in this manner the reference numerals do not affect the consideration of the recited elements and characteristics, which are exemplarily recognizable with them. The scope of the present invention shall be defined by its appended claims, including known equivalents and unforeseeable equivalents at the time of filing of this application.

LIST OF REFERENCE LABELS

1 Longitudinal wires
2 Receptacles for longitudinal wires on receptacles carrier
3 Receptacles carrier
4 Prefeeder carrier
5 Feed/supply axis for longitudinal wires
6 Feeder carrier
7 Grippers of feeder carrier
8 Motor for moving gripper perpendicularly to level of produced mesh
10 Welding heads
11 Grippers of welding heads
12 Transverse wire to be welded at welding heads
13 Welding axis for transverse wires on the welding heads
14 Mesh carrier
15 Grippers for mesh carrier
20 Produced mesh
21 Example of produced mesh
22 First group longitudinal wires of mesh
23 Second group longitudinal wires of mesh
24 Intermediate under-production mesh
31 Produced mesh
32 Longitudinal wire
33 Transverse wire
40 Welder
41 Welding heads
42 Stationary electrode
43 Base of stationary electrode
44 Flexible conductor
45 Electrical contact
46 Cylinder
47 Conductor of electrical current
48 Movable electrode
49 Base of movable electrode
50 Flexible conductor
51 Electrical contact
52 Cylinder
53 Conductor of electrical current
55 Wire guide
56 Wire gripper on welding head
57 Cylinder of wire gripper of welding head
58 Cylinder for movable electrode
60 Welding transformer
62 Linear slide blocks
63 Linear guide bearings
64 Drive screw (linear screw)
65 Rotary nut—clutch
66 Electrical motor
70 Feeder carrier
71 Entry guide to gripper of feeder.
72 Feeder gripper
73 Pneumatic cylinder.
74 Guide
75 Cylinder
76 Gripper plate
77 Linear slide blocks
78 Drive screw (linear screw)
79 Rotary nut—clutch
80 Slide blocks
81 Guide
82 Toothed gear
83 Toothed rack/pinion
84 Shaft
85 Motor
86 Toothed rack/pinion
87 Base of carrier
88 Motor
90 Mesh carrier
91 Gripper
92 Stationary clamp part
93 Movable clamp part
94 Cylinder
95 Cylinder
96 Plate
97 Linear slide block
98 Drive screw (linear screw)
99 Rotary nut—clutch
100 Motor
101 Motor
102 Shaft
103 Toothed gear
104 Toothed rack/pinion
105 Base of carrier
110 Prefeeder
111 Double receptacle
112 Single receptacle
113 Receptacles carrier
114 Linear slide blocks
115 Linear guide bearings
116 Drive screw (linear screw)
117 Rotary nut—clutch
118 Motor
120 Prefeeder carrier
121 Linear slide blocks
122 Linear guide bearings
123 Chain
124 Chain gear
125 Shaft
126 Shaft
127 Motor
128 Connection
130 Chain
131 Receptacle of wire on chain
132 Shaft
133 Chain gear
134 Chain gear
137 Motor
138 Coil of wire
139 Supply reel
140 Prestraightener
141 Rotor straightener
142 Exit and measuring rollers
143 Cutter
144 Collector 145 Transverse wire position
146 Cylinder
147 Gripper
148 Magnet
149 Carrier
150 Conveyor belt
151 Motor
152 Flap
153 Cylinder
154 Wire position
155 Cylinder
156 Flap
157 Wire position
158 Beam spring
159 Push rod
160 Cylinder
165 Coil
166 Supply reel
167 Collector
168 Cutter
169 Entry rollers
170 Rotor straightener
171 Exit and measuring rollers
172 Motor

What is claimed is:

1. A prefeeder for a mesh production system, comprising:
a prefeeder carrier;
said prefeeder carrier having a plurality of receptacle carriers movably mounted thereon;
a first arrangement of bearings between said prefeeder carrier and said plurality of receptacle carriers;
each of said plurality of receptacle carriers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective receptacle carriers on said first arrangement of bearings along said prefeeder carrier and along the length of said linear screw;
a first motor operatively connected to controllably rotate said linear screw;
each of said plurality of receptacle carriers including at least one receptacle configured to receive a mesh wire;
said prefeeder carrier being movably mounted on a base;
a second arrangement of bearings between said prefeeder carrier and said base; and
a second motor operatively connected to controllably translate and position said prefeeder carrier on said base.

2. A mesh production system, comprising:
a prefeeder including a prefeeder carrier;
said prefeeder carrier having a plurality of receptacle carriers movably mounted thereon;
a first arrangement of bearings between said prefeeder carrier and said plurality of receptacle carriers;
each of said plurality of receptacle carriers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective receptacle carriers on said first arrangement of bearings along said prefeeder carrier and along the length of said linear screw;
a respective motor operatively connected to controllably rotate said linear screw;
each of said plurality of receptacle carriers including at least one receptacle configured to receive a mesh wire;
said prefeeder carrier being movably mounted on a base;
a second arrangement of bearings between said prefeeder carrier and said base; and,
a respective motor operatively connected to controllably translate and position said prefeeder carrier on said base;
the mesh production system further comprising
a feeder carrier assembly comprising,
a plurality of feeder grippers, said plurality of feeder grippers being movably mounted on a support base;
an arrangement of bearings between said plurality of feeder grippers and said support base;
each of said plurality of feeder grippers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective receptacle carriers on said arrangement of bearings along said plate and along the length of said linear screw;
a respective motor operatively connected to controllably rotate said linear screw;
each of said plurality of feeder grippers including a respective controllable actuator connected to controllably activate the respective feeder gripper to grip mesh wire;
each of said plurality of feeder grippers including a respective controllable elevation actuator connected to selectively and controllably move its respective feeder gripper out of a plane of mesh production;
said support base being supported on a feeder carrier frame;
an arrangement of guides supporting said feeder carrier frame; and,
a respective motor operatively connected to drive and position said feeder carrier frame along said arrangement of guides;
the mesh production system further comprising
a welding unit comprising,
a plurality of welding heads, said plurality of welding heads being movably mounted on a welder base;
an arrangement of bearings between said plurality of welding heads and said welder base;
each of said plurality of welding heads including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective welding heads on said arrangement of bearings along said welder base and along the length of said linear screw;
a respective motor operatively connected to controllably rotate said linear screw;
each of said plurality of welding heads including a respective controllable actuator connected to controllably activate a respective gripper to grip mesh wire;
each of said plurality of welding heads including electrodes situated to weld transverse wires to longitudinal wires for mesh production;
a transverse wire deposition assembly;
the mesh production system further comprising
a mesh carrier assembly comprising,
  a plurality of mesh grippers, said plurality of mesh grippers being movably mounted on a support base;
  an arrangement of bearings between said plurality of mesh grippers and said support base;
  each of said plurality of mesh grippers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective mesh grippers on said arrangement of bearings along said support base and along the length of said linear screw;
  a respective motor operatively connected to controllably rotate said linear screw;
  each of said plurality of mesh grippers including a respective controllable actuator connected to controllably activate the respective mesh gripper to grip mesh wire by closing;
  each of said plurality of mesh grippers including a respective controllable elevation actuator connected to selectively and controllably tilt its respective feeder gripper out of a plane of mesh production;
  said support base being supported on a mesh carrier frame;
  an arrangement of guides supporting said mesh carrier frame; and,
  a second motor operatively connected to drive and position said mesh carrier frame along said arrangement of guides.

3. A mesh production system, comprising:
a prefeeder, said prefeeder including a prefeeder carrier;
said prefeeder carrier having a plurality of receptacle carriers movably mounted thereon;
a first arrangement of bearings between said prefeeder carrier and said plurality of receptacle carriers;
each of said plurality of receptacle carriers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective receptacle carriers on said first arrangement of bearings along said prefeeder carrier and along the length of said linear screw;
a respective motor operatively connected to controllably rotate said linear screw;
each of said plurality of receptacle carriers including at least one receptacle configured to receive a mesh wire;
said prefeeder carrier being movably mounted on a base;
a second arrangement of bearings between said prefeeder carrier and said base; and,
a respective motor operatively connected to controllably translate and position said prefeeder carrier on said base;
the mesh production system further comprising
  a feeder carrier assembly including a plurality of feeder grippers, said plurality of feeder grippers being movably mounted on a support base and controllably positionable on said support base to each respectively selectively receive wire from a respective receptacle carrier of said prefeeder carrier;
  each of said plurality of feeder grippers including a respective controllable elevation actuator connected to selectively and controllably move its respective feeder gripper out of a plane of mesh production;
  said support base being supported on a feeder carrier frame;
  an arrangement of guides supporting said feeder carrier frame; and
  a respective motor operatively connected to drive and position said feeder carrier frame along said arrangement of guides;
the mesh production system further comprising
  a welding unit including a plurality of welding heads, said plurality of welding heads being movably mounted on a welder base and for controlled positioning on said welder base to each respectively selectively receive wire from an aligned respective feeder gripper of said feeder carrier;
  each of said plurality of welding heads including of electrodes situated to weld transverse wires to longitudinal wires for mesh production;
  a transverse wire deposition assembly;
  a mesh carrier assembly including a plurality of mesh grippers, said plurality of mesh grippers being movably mounted on a support base, and controllably positionable on said support base to each respectively grip mesh wire;
  said support base being supported on a mesh carrier frame;
  an arrangement of guides supporting said mesh carrier frame; and
  a respective motor operatively connected to drive and position said mesh carrier frame along said arrangement of guides.

4. A mesh production system, comprising:
a prefeeder, said prefeeder including a prefeeder carrier;
said prefeeder carrier having a plurality of receptacle carriers movably mounted thereon;
a first arrangement of bearings between said prefeeder carrier and said plurality of receptacle carriers;
each of said plurality of receptacle carriers including a respective associated controllable clutch, each of said respective controllable clutches being situated to controllably engage a respective rotary nut, said rotary nuts all being mounted on a linear screw drive so that they are driven in rotation by a rotation of said linear screw when not engaged by their respective clutches, and driven in translation on said linear screw by a rotation of said linear screw when engaged by their respective clutches thus controllably translating and positioning their respective receptacle carriers on said first arrangement of bearings along said prefeeder carrier and along the length of said linear screw;
a respective motor operatively connected to controllably rotate said linear screw;
each of said plurality of receptacle carriers including at least one receptacle configured to receive a mesh wire;
said prefeeder carrier being movably mounted on a base;
a second arrangement of bearings between said prefeeder carrier and said base; and,
a respective motor operatively connected to controllably translate and position said prefeeder carrier on said base;
a feeder carrier assembly including a plurality of feeder grippers, said plurality of feeder grippers being movably mounted on a support base and controllably positionable on said support base to each respectively selectively receive wire from an aligning/aligned respective receptacle carrier of said prefeeder carrier;
said plurality of feeder grippers being selectively and controllably moveable out of a plane of mesh production;
a respective motor operatively connected to drive and position said feeder carrier assembly towards a welding unit;
said welding unit including a plurality of welding heads, said plurality of welding heads being movably mounted on a welder base and for controlled positioning on said welder base to each respectively selectively receive wire from an aligned respective feeder gripper of said feeder carrier;
each of said plurality of welding heads including electrodes situated to weld transverse wires to longitudinal wires for mesh production;
a transverse wire deposition assembly;
a mesh carrier assembly including a plurality of mesh grippers, said plurality of mesh grippers being movably mounted for controlled positioning to respective positions where each of said mesh grippers respectively grips mesh transverse wire; and
a respective motor operatively connected to drive and position said mesh carrier assembly away from said welding unit.

5. A mesh production system, comprising:
a prefeeder, said prefeeder including a prefeeder carrier;
said prefeeder carrier having a plurality of receptacle carriers movably mounted thereon;
a first arrangement of bearings between said prefeeder carrier and said plurality of receptacle carriers;
each of said plurality of receptacle carriers including a respective associated controllable clutch, each of said respective controllable clutches being situated to controllably engage a respective rotary nut, said rotary nuts all being mounted on a linear drive so that they are driven in rotation by a rotation of said linear drive when not engaged by their respective clutches, and driven in translation on/along said linear drive by a rotation of said linear drive when engaged by their respective clutches thus controllably translating and positioning their respective receptacle carriers on said first arrangement of bearings along said prefeeder carrier and along the length of said linear drive;
a respective motor operatively connected to controllably rotate said linear drive;
each of said plurality of receptacle carriers including at least one receptacle configured to receive a mesh wire;
said prefeeder carrier being movably mounted on a base;
a second arrangement of bearings between said prefeeder carrier and said base; and,
a respective motor operatively connected to controllably translate and position said prefeeder carrier on said base;
a feeder carrier assembly including a plurality of feeder grippers, said plurality of feeder grippers being movably mounted on a support base and being controllably positionable on said support base to each respectively selectively receive wire from a respective receptacle carrier of said prefeeder carrier;
said plurality of feeder grippers being selectively and controllably moveable out of a plane of mesh production;
a respective motor operatively connected to drive and position said feeder carrier assembly towards a welding unit;
said welding unit including a plurality of welding heads, said plurality of welding heads being movably mounted on a welder base and for controlled positioning on said welder base to each respectively selectively receive wire from an aligned/aligning respective feeder gripper of said feeder carrier;
each of said plurality of welding heads including electrodes situated to weld transverse wires to longitudinal wires for mesh production;
a transverse wire deposition assembly;
a mesh carrier assembly including a plurality of mesh grippers, said plurality of mesh grippers being movably mounted for controlled positioning to respective positions where each of said mesh grippers respectively grips mesh transverse wire; and
a respective motor operatively connected to drive and position said mesh carrier assembly away from said welding unit.

6. A mesh production system, comprising:
a prefeeder, said prefeeder including a prefeeder carrier;
said prefeeder carrier having a plurality of receptacle carriers movably mounted thereon;
each of said plurality of receptacle carriers individually being controllably positionable along said prefeeder carrier;
a respective motor operatively connected to selectively controllably position said plurality of receptacle carriers, in an unrestricted manner;
each of said plurality of receptacle carriers including at least one receptacle configured to receive a mesh wire;
said prefeeder carrier being movably mounted on a base;
a respective motor operatively connected to controllably translate and position said prefeeder carrier on said base;
a feeder carrier assembly including a plurality of feeder grippers, said plurality of feeder grippers being movably mounted on a support base and controllably positionable on said support base to each respectively selectively receive wire from an aligning/aligned respective receptacle carrier of said prefeeder;
said plurality of feeder grippers being selectively/controllably moveable out of a plane of mesh production;
a respective motor operatively connected to drive and position said feeder carrier assembly towards a welding unit;
said welding unit including a plurality of welding heads, said plurality of welding heads being movably mounted on a welder base and for controlled positioning on said welder base to each respectively selectively receive wire from an aligned respective feeder gripper of said feeder carrier;

each of said plurality of welding heads including electrodes situated to weld transverse wires to longitudinal wires for mesh production;

a transverse wire deposition assembly;

a mesh carrier assembly including a plurality of mesh grippers, said plurality of mesh grippers being movably mounted for controlled positioning to respective positions where each of said mesh grippers respectively grips mesh transverse wire; and a respective motor operatively connected to drive and position said mesh carrier assembly away from said welding unit.

* * * * *